(12) United States Patent
Cao et al.

(10) Patent No.: US 12,608,759 B2
(45) Date of Patent: Apr. 21, 2026

(54) IMAGE SUPER-RESOLUTION METHOD USING FREQUENCY DOMAIN FEATURES

(71) Applicant: Tencent Technology (Shenzhen) Company Limited, Shenzhen (CN)

(72) Inventors: Yun Cao, Shenzhen (CN); Guangpin Tao, Shenzhen (CN); Xiaozhong Ji, Shenzhen (CN); Chuming Lin, Shenzhen (CN); Ying Tai, Shenzhen (CN); Chengjie Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 395 days.

(21) Appl. No.: 18/202,728

(22) Filed: May 26, 2023

(65) Prior Publication Data

US 2023/0298135 A1 Sep. 21, 2023

Related U.S. Application Data

(63) Continuation of application No. PCT/CN2022/112770, filed on Aug. 16, 2022.

(30) Foreign Application Priority Data

Sep. 24, 2021 (CN) .......................... 202111120036.X

(51) Int. Cl.
*G06T 3/4053* (2024.01)
*G06T 3/4061* (2024.01)
*G06T 3/4084* (2024.01)

(52) U.S. Cl.
CPC .......... *G06T 3/4053* (2013.01); *G06T 3/4061* (2013.01); *G06T 3/4084* (2013.01)

(58) Field of Classification Search
CPC ... G06T 3/4053; G06T 3/4061; G06T 3/4084; G06T 3/4046; G06T 5/20; G06T 5/70; G06V 10/774
See application file for complete search history.

(56) References Cited

U.S. PATENT DOCUMENTS

| | | | | |
|---|---|---|---|---|
| 9,692,939 B2 * | 6/2017 | Irani | .................... | H04N 1/4092 |
| 2021/0295475 A1 * | 9/2021 | He | ........................ | G06V 10/993 |
| 2022/0122223 A1 * | 4/2022 | Choi | ........................ | G06T 5/70 |

FOREIGN PATENT DOCUMENTS

| | | | | |
|---|---|---|---|---|
| CN | 108305230 A | 7/2018 | | |
| CN | 110782393 A * | 2/2020 | .......... | G06T 3/4046 |
| CN | 113139904 A * | 7/2021 | ............. | G06N 3/045 |

OTHER PUBLICATIONS

M. Yamac, B. Ataman and A. Nawaz, "KernelNet: A Blind Super-Resolution Kernel Estimation Network," 2021 IEEE/CVF Conference on Computer Vision and Pattern Recognition Workshops (CVPRW), Nashville, TN, USA, 2021, pp. 453-462, doi: 10.1109/CVPRW53098.2021.00056. (Year: 2021).*

(Continued)

*Primary Examiner* — Chan S Park
*Assistant Examiner* — Paulo Andres Garcia
(74) *Attorney, Agent, or Firm* — ArentFox Schiff LLP

(57) ABSTRACT

An image super-resolution method includes performing frequency domain transformation on a first image to obtain a spectral feature of the first image, the spectral feature representing a distribution of a grayscale gradient in the first image. The method further includes performing blur kernel prediction based on the spectral feature to obtain a blur kernel of the first image, the blur kernel being a convolution kernel. The method also includes performing super-resolution processing on the first image based on the blur kernel to generate a super-resolved image, a definition of the super-resolved image being higher than a definition of the first image.

19 Claims, 9 Drawing Sheets

(56)     References Cited

OTHER PUBLICATIONS

Xue, S., Qiu, W., Liu, F et al. Faster image super-resolution by improved frequency-domain neural networks. SIViP 14, 257-265 (2020). https://doi.org/10.1007/s11760-019-01548-8 (Year: 2020).*

J. Yoo, N. Ahn and K. Sohn, "Rethinking Data Augmentation for Image Super-resolution: A Comprehensive Analysis and a New Strategy," in 2020 IEEE/CVF Conference on Computer Vision and Pattern Recognition (CVPR), Seattle, WA, USA, 2020, pp. 8372-8381, doi: 10.1109/CVPR42600.2020.00840. (Year: 2020).*

S. Lim, J. Kim and W. Kim, "Deep Spectral-Spatial Network for Single Image Deblurring," in IEEE Signal Processing Letters, vol. 27, pp. 835-839, 2020, doi: 10.1109/LSP.2020.2995106 (Year: 2020).*

Sefi Bell-Kligler and Assaf Shocher and Michal Irani, Blind Super-Resolution Kernel Estimation using an Internal-GAN, 2020, https://arxiv.org/abs/1909.06581 (Year: 2020).*

Chakrabarti, A. (2016). A Neural Approach to Blind Motion Deblurring. In: Leibe, B., Matas, J., Sebe, N., Welling, M. (eds) Computer Vision ECCV 2016. ECCV 2016. Lecture Notes in Computer Science(), vol. 9907. Springer, Cham. https://doi.org/10.1007/978-3-319-46487-9_14 (Year: 2016).*

X. Ji et al., "Real-World Super-Resolution via Kernel Estimation and Noise Injection," in 2020 IEEE/CVF Conference on Computer Vision and Pattern Recognition Workshops (CVPRW), Seattle, WA, USA, 2020, pp. 1914-1923, doi: 10.1109/CVPRW50498.2020.00241. (Year: 2020).*

Jinjin Gu and Hannan Lu and Wangmeng Zuo and Chao Dong, Blind Super-Resolution With Iterative Kernel Correction, May 29, 2019, https://arxiv.org/abs/1904.03377 (Year: 2019).*

International Search Report and Written Opinion received for PCT Patent Application No. PCT/CN2022/112770, mailed on Nov. 16, 2022, 11 pages (5 pages of English Translation and 6 pages of Original Document).

Extended European Search Report and Search Opinion received for European Application No. 22871685.8, mailed on Dec. 6, 2024, 8 pages.

Ji et al., "Frequency Consistent Adaptation for Real World Super Resolution", arxiv.org, Cornell university library, 201 Olin library Cornell university Ithaca, NY 14853, XP081841160, Dec. 18, 2020, 9 pages.

* cited by examiner

Image

Spectrogram

High-quality image    Gaussian kernel    Gaussian blurred image    Disk kernel    Disk blurred image    Motion kernel    Motion blurred image Spatial domain Frequency domain Frequency domain

S    F    G

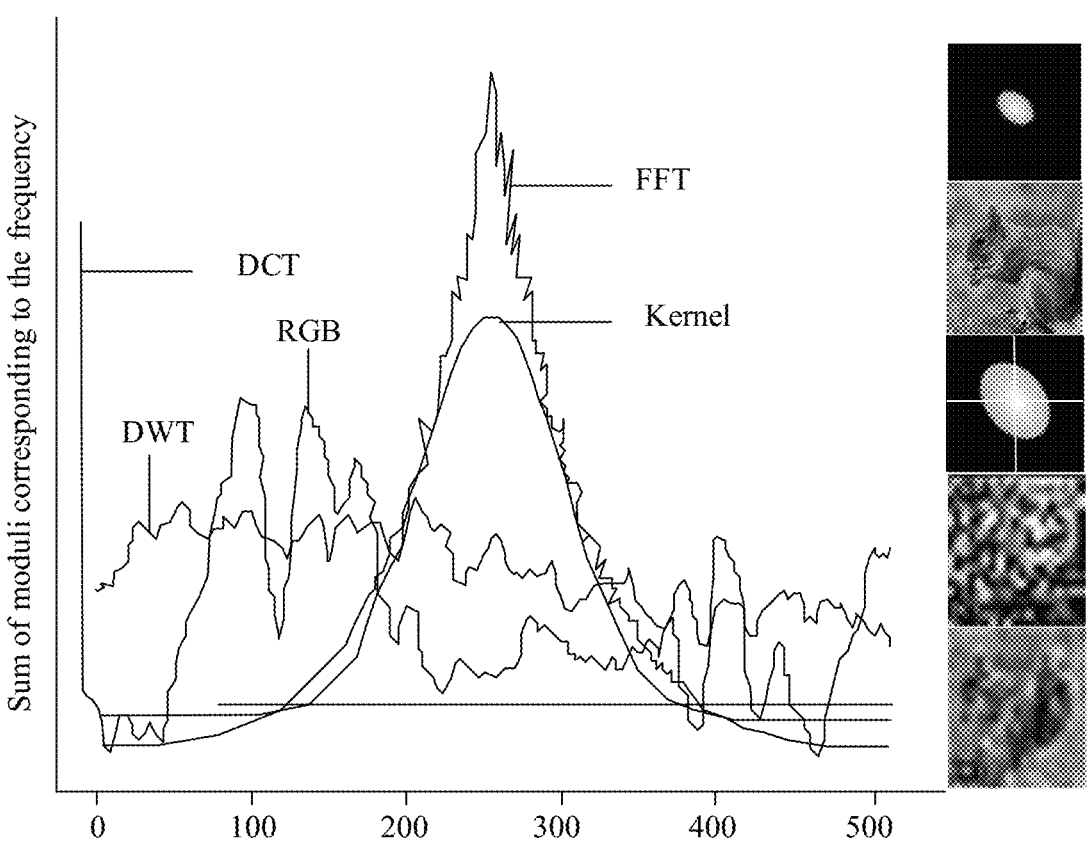

Estimated position of x in an input and interpolation kernel matrix

FIG. 3

Perform frequency domain transformation on a first image to obtain a spectral feature of the first image — 401

Perform blur kernel prediction on the basis of the spectral feature to obtain a blur kernel of the first image, the blur kernel being a convolution kernel used in performing blur processing on an image — 402

Perform super-resolution processing on the first image on the basis of the blur kernel to generate a super-resolved image, the definition of the super-resolved image being higher than that of the first image — 403

FIG. 4

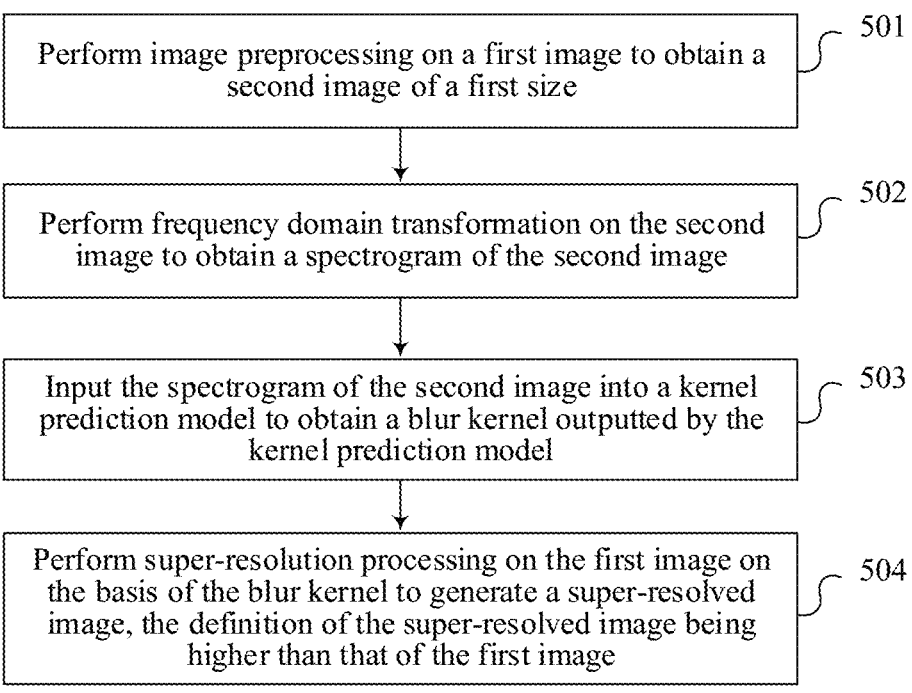

| | |
|---|---|
| Perform image preprocessing on a first image to obtain a second image of a first size | 501 |
| Perform frequency domain transformation on the second image to obtain a spectrogram of the second image | 502 |
| Input the spectrogram of the second image into a kernel prediction model to obtain a blur kernel outputted by the kernel prediction model | 503 |
| Perform super-resolution processing on the first image on the basis of the blur kernel to generate a super-resolved image, the definition of the super-resolved image being higher than that of the first image | 504 |

FIG. 5

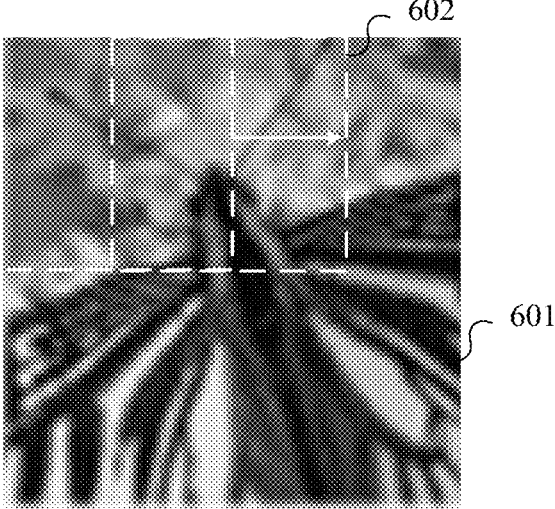

FIG. 6

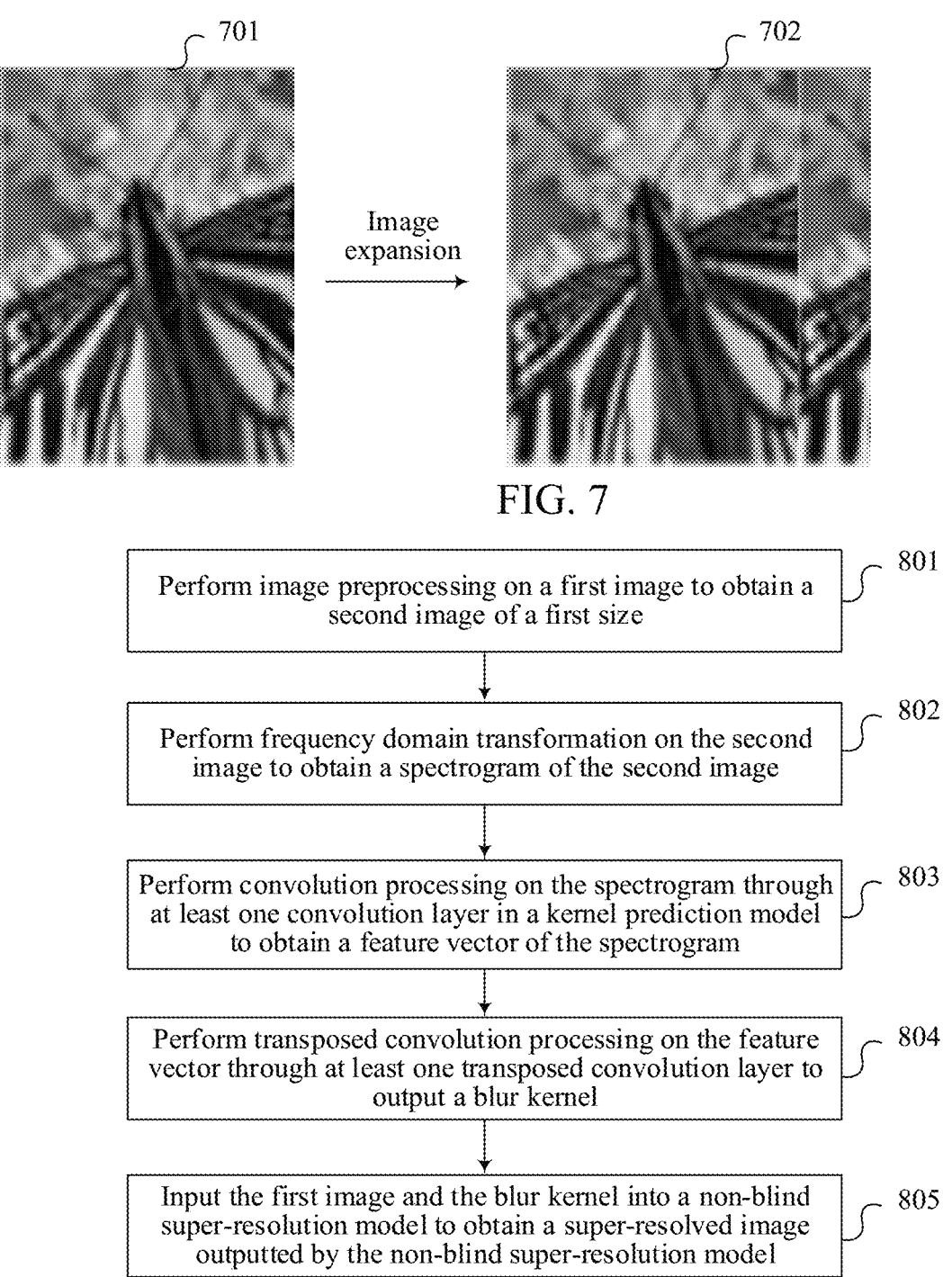

701    702

Image
expansion

FIG. 7

801
Perform image preprocessing on a first image to obtain a
second image of a first size 802
Perform frequency domain transformation on the second
image to obtain a spectrogram of the second image 803
Perform convolution processing on the spectrogram through
at least one convolution layer in a kernel prediction model
to obtain a feature vector of the spectrogram 804
Perform transposed convolution processing on the feature
vector through at least one transposed convolution layer to
output a blur kernel 805
Input the first image and the blur kernel into a non-blind
super-resolution model to obtain a super-resolved image
outputted by the non-blind super-resolution model

FIG. 8

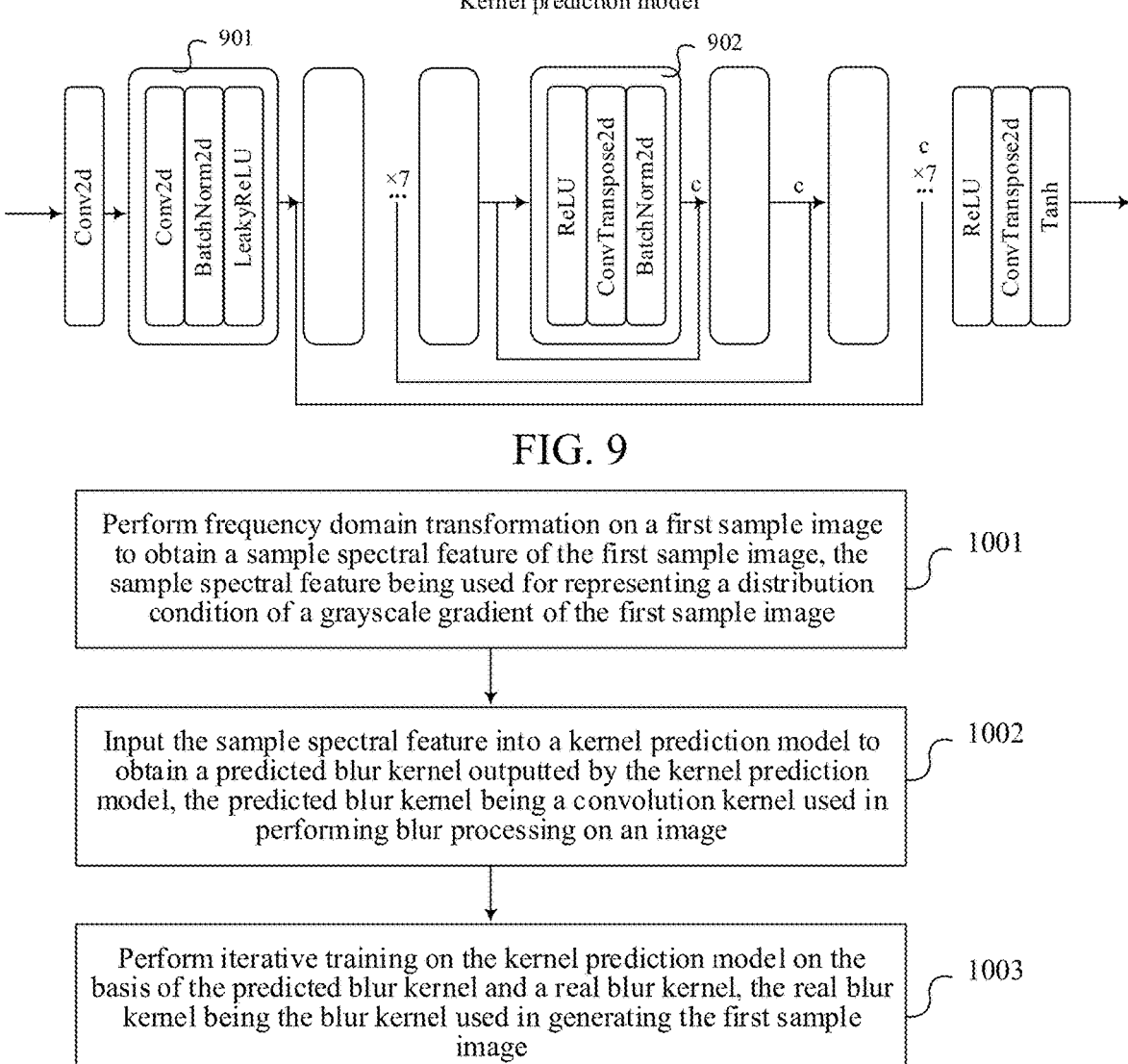

FIG. 9

Perform frequency domain transformation on a first sample image to obtain a sample spectral feature of the first sample image, the sample spectral feature being used for representing a distribution condition of a grayscale gradient of the first sample image ⌐ 1001

Input the sample spectral feature into a kernel prediction model to obtain a predicted blur kernel outputted by the kernel prediction model, the predicted blur kernel being a convolution kernel used in performing blur processing on an image ⌐ 1002

Perform iterative training on the kernel prediction model on the basis of the predicted blur kernel and a real blur kernel, the real blur kernel being the blur kernel used in generating the first sample image ⌐ 1003

FIG. 10

Discriminator

IMAGE SUPER-RESOLUTION METHOD USING FREQUENCY DOMAIN FEATURES

RELATED APPLICATIONS

This application is a continuation of International Patent Application No. PCT/CN2022/112770, filed on Aug. 16, 2022, which claims priority to Chinese Patent Application No. 202111120036.X, entitled "IMAGE SUPER-RESOLUTION METHOD AND APPARATUS, DEVICE, AND STORAGE MEDIUM" and filed on Sep. 24, 2021. The disclosures of the prior applications are hereby incorporated by reference in their entirety.

FIELD OF THE TECHNOLOGY

Embodiments of this application relate to the technical field of image processing, including an image super-resolution method and apparatus, a device, and a storage medium.

BACKGROUND OF THE DISCLOSURE

Degradation refers to turning a high-quality image into a low-quality image, i.e., a blurred and noisy image. Strategies that lead to image degradation mainly include Gaussian blur, motion blur, camera out of focus, random noise addition, etc., and image blur is caused by convolution of a clear image with a blur kernel. On the contrary, super-resolution technology is to process a low-resolution blurred image into a high-resolution clear image, with the picture content unchanged. The super-resolution technology mainly includes non-blind super-resolution and blind super-resolution, where the non-blind super-resolution is to perform image restoration when image degradation strategies are known, while the blind super-resolution refers to the super-resolution technology used when image degradation strategies are not known.

In related art, for the non-blind super-resolution technology, a bicubic interpolation kernel is usually used to form pairwise data for model training; for the blind super-resolution technology, one method is to transform an image for which a degradation method is unknown into a bicubic degraded image domain and then use the non-blind super-resolution technology for restoration to obtain a high-quality image, and another method is to perform blur kernel estimation on the basis of a spatial domain of an image and then use an estimated blur kernel for restoration to obtain a high-quality image.

However, the non-blind super-resolution technology can only restore images with blur kernels known, and the applicability thereof is poor; and in the blind super-resolution technology, transforming an image with an unknown blur kernel into a bicubic blurred image domain will cause loss of image information, making it impossible for the non-blind super-resolution technology to restore to obtain a high-quality high-definition image in the subsequent process. Furthermore, it is difficult to perform blur kernel estimation based on the spatial domain, and some special blur kernels of motion blur cannot be predicted.

SUMMARY

Embodiments of this application provide an image super-resolution method and apparatus, a device, and a storage medium. The technical solutions are as follows.

In an embodiment, an image super-resolution method includes performing frequency domain transformation on a first image to obtain a spectral feature of the first image, the spectral feature representing a distribution of a grayscale gradient in the first image. The method further includes performing blur kernel prediction based on the spectral feature to obtain a blur kernel of the first image, the blur kernel being a convolution kernel. The method also includes performing super-resolution processing on the first image based on the blur kernel to generate a super-resolved image, a definition of the super-resolved image being higher than a definition of the first image.

In an embodiment, an image super-resolution method includes performing frequency domain transformation on a first sample image to obtain a sample spectral feature of the first sample image, the sample spectral feature representing a distribution of a grayscale gradient in the first sample image. The method further includes inputting the sample spectral feature into a kernel prediction model to obtain a predicted blur kernel outputted by the kernel prediction model, the predicted blur kernel being a convolution kernel. The method also includes performing iterative training on the kernel prediction model based on the predicted blur kernel and a real blur kernel, the real blur kernel being a blur kernel used in generating the first sample image.

In an embodiment, an image super-resolution apparatus includes processing circuitry configured to perform frequency domain transformation on a first image to obtain a spectral feature of the first image, the spectral feature representing a distribution of a grayscale gradient in the first image. The processing circuitry is further configured to perform blur kernel prediction based on the spectral feature to obtain a blur kernel of the first image, the blur kernel being a convolution kernel. The processing circuitry is further configured to perform super-resolution processing on the first image based on the blur kernel to generate a super-resolved image, a definition of the super-resolved image being higher than a definition of the first image.

In an embodiment, a non-transitory computer-readable storage medium stores computer-readable instructions thereon, which, when executed by processing circuitry, cause the processing circuitry to perform an image super-resolution method includes performing frequency domain transformation on a first image to obtain a spectral feature of the first image, the spectral feature representing a distribution of a grayscale gradient in the first image. The method further includes performing blur kernel prediction based on the spectral feature to obtain a blur kernel of the first image, the blur kernel being a convolution kernel. The method also includes performing super-resolution processing on the first image based on the blur kernel to generate a super-resolved image, a definition of the super-resolved image being higher than a definition of the first image.

The technical solutions provided in the embodiments of this application may include at least the following beneficial effects:

In the embodiments of this disclosure, the blur kernel of the first image is estimated on the basis of a frequency domain feature of the image, and the first image is then subjected to super-resolution processing. Since an image and a corresponding blur kernel have shape and structure correlations in respect of the frequency domain feature, compared with image spatial domain-based blur kernel estimation methods, the accuracy of blur kernel prediction can be improved and then the quality of a high-resolution image obtained after super-resolution processing is improved. Moreover, this disclosure is not limited to the blur kernel type and the image type, that is, this disclosure can be applied to super-resolution of both a synthetic image and a real image.

BRIEF DESCRIPTION OF THE DRAWINGS

FIG. 3 shows comparison of relations between frequency domain features obtained with different frequency domain transformation methods and a blur kernel provided in one exemplary embodiment of this disclosure.

FIG. 4 is a flowchart of an image super-resolution method provided in one exemplary embodiment of this disclosure.

FIG. 5 is a flowchart of an image super-resolution method provided in another exemplary embodiment of this disclosure.

FIG. 6 is a schematic diagram of an image cropping method provided in one exemplary embodiment of this disclosure.

FIG. 7 is a schematic diagram of an image expansion method provided in one exemplary embodiment of this disclosure.

FIG. 8 is a flowchart of an image super-resolution method provided in another exemplary embodiment of this disclosure.

FIG. 9 is a structural block diagram of a kernel prediction model provided in one exemplary embodiment of this disclosure.

FIG. 10 is a flowchart of an image super-resolution method provided in another exemplary embodiment of this disclosure.

DESCRIPTION OF EMBODIMENTS

Figures 1, 2:
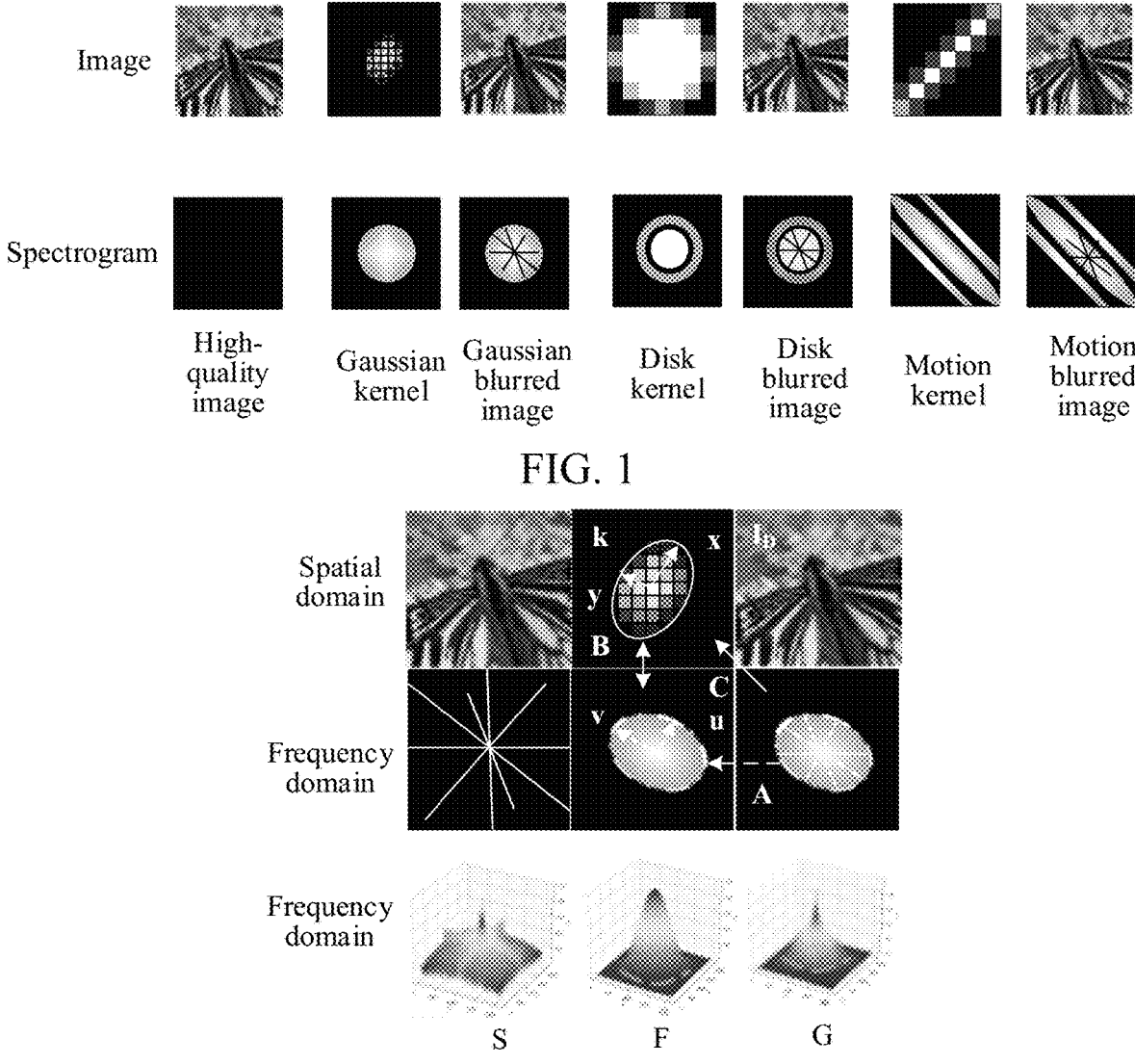
FIG. 1 shows blur kernels, and blurred images and corresponding spectrograms thereof provided in one exemplary embodiment of this disclosure.
FIG. 2 shows comparison of features of blur kernels and blurred images in a spatial domain and a frequency domain provided in one exemplary embodiment of this disclosure.

First, several key terms involved in this disclosure are introduced.

Generative adversarial network (GAN): the GAN refers to an unsupervised learning method, implements learning by making two neural networks contest with each other, and is composed of a generative network and a discriminative network. The generative network implements random sampling from a latent space to obtain an input, and an output result thereof needs to simulate a real sample in a training set as much as possible. The input of the discriminative network is the real sample or the output of the generative network, and the objective of the discriminative network is to distinguish the output of the generative network from the real sample as much as possible, while the generative network is to fool the discriminative network as much as possible. The two networks contest with each other and constantly adjust respective parameters, such that a final output result is similar to the real one.

Degradation: degradation refers to turning a high-quality (clear and noise-free) picture into a low-quality (blurred and noisy) picture. Typical degradation strategies include Gaussian blur, motion blur, random noise addition, etc., and there is also degradation caused by photographing conditions, such as photographing shake, camera out of focus, camera noise, etc.

Blur kernel: the blur kernel actually refers to a matrix. After convolving a clear image with a blur kernel, the image becomes blurred, and this is why it is called the blur kernel. The blur kernel is one convolution kernel. The essence of an image convolution operation is matrix convolution. Some special convolution kernels may cause special effects on the image.

Blind super-resolution: super-resolution, i.e., super-resolution technology, is to process a low-resolution blurred image into a high-resolution image, with the picture content unchanged. The blind super-resolution refers to the super-resolution technology with degradation strategies unknown, that is, how a low-resolution image is obtained by transformation from the high-resolution image is unknown. Generally, super-resolution for images such as a real photo belongs to blind super-resolution.

In related art, depending on whether blur kernels are known or unknown, image super-resolution methods are classified into blind super-resolution methods and non-super-resolution methods.

In the case of non-blind super-resolution, the blur kernel used for synthesizing a low-quality image is known, and the low-quality image can be restored into a high-quality image through the known blur kernel. A bicubic interpolation kernel is usually used to form pairwise data for training. The advantages of the method are that the super-resolution effect is better when the degradation kernel is known, and model training is supervised training, which is simple and immediate. The disadvantage is that super-resolution processing cannot be performed on images with unknown blur kernels, but usually, the blur kernel of real image data cannot be known, thus causing poor applicability.

In the case of blind super-resolution, the blur kernel of the image is unknown, and restoration through a low-quality image is performed to obtain a high-quality image. Currently, there are two mainstream blind super-resolution methods. One is to transform a low-resolution image for which a degradation method is unknown into a bicubic degraded image domain and then use the non-blind super-resolution method for restoration to obtain a high-definition image. The method can transform blind super-resolution into non-blind super-resolution; however, transforming a low-resolution image for which degradation is unknown into a bicubic degraded picture will cause loss of information, making it impossible for the non-blind super-resolution method to restore to obtain a high-quality high-definition image in the subsequent process. The other one is to use a low-resolution picture for which the degradation method is unknown to predict a degradation kernel and then use the predicted degradation kernel for restoration to obtain a high-definition image. The restoration process still uses the original low-quality picture so that information will not be lost; however, it is difficult to estimate the blur kernel through the spatial domain of the image, and the method can only be used to predict the general blur kernel and it is hard to be used to predict the blur kernel of motion blur.

In order to solve the above technical problems and improve the image super-resolution quality, embodiments of this disclosure provide an image super-resolution method, in which the frequency domain of an image is used for the first time to implement blur kernel estimation. FIG. 1 shows low-quality images obtained after separately applying blur effects of a Gaussian kernel, a disk kernel, and a motion kernel on a high-quality image, where the upper part shows various blur kernels and corresponding blurred images (spatial domain), and the lower part shows various blur kernels and spectrograms corresponding to the blurred images (frequency domain). It can be seen from FIG. 1 that compared with the spatial domain, the frequency domain features of the blur kernels have more direct and obvious shape and structure correlations with the frequency domain features of the low-quality images generated under the action of the blur kernels. Therefore, the frequency domain features of images are more beneficial to accurate prediction of the blur kernels.

FIG. 2 illustrates that the frequency domain features of the images degraded by the blur kernels have strong correlations with the frequency domain features of the used blur kernels. Moreover, from different forms of frequency domain transformation in FIG. 3, it can be seen that compared with discrete cosine transform (DCT) and discrete wavelet transformation (DWT), the spectral features obtained by fast Fourier transform (FFT) are more correlated with the frequency domain features of the blur kernels. The blur kernel of an image is estimated on the basis of a frequency domain feature of the image, and the image is then subjected to super-resolution processing. Since an image and a corresponding blur kernel have shape and structure correlations in respect of the frequency domain feature, compared with image spatial domain-based blur kernel estimation methods, the accuracy of blur kernel prediction can be improved and then the quality of a high-resolution image obtained after super-resolution processing is improved.

The application scenarios of the image super-resolution method provided in the embodiments of this disclosure are schematically described below.

1. Image Editing

The image super-resolution method can be implemented as an image super-resolution function in an image editing application, so as to conveniently improve the image definition and quality and transform a low-resolution image into a high-resolution image. Upon receipt of a super-resolution operation for a low-resolution image, a computer device performs frequency domain transformation on the image, performs blur kernel estimation on the basis of a frequency domain feature of the image, and then performs super-resolution processing on the image on the basis of an estimated blur kernel, thereby facilitating a user improving image quality. It is also available to automatically improve photograph quality in a photographing process, so as to mitigate the image blur problem caused by photographing shake, camera out of focus, camera noise, etc.

2. Video Picture Enhancement

In addition to super-resolution processing on static images, the image super-resolution method can also be applied to quality enhancement for video pictures. For example, for a low-definition video, a terminal performs frequency domain transformation on the picture of each video frame (or extracts some video frames), performs prediction to obtain a corresponding blur kernel, and then performs super-resolution processing on each video frame, thereby improving the quality of the entire video to obtain a high-definition video. Or, in recent popular short video and live streaming applications, after a video is generated, a video sending terminal may compress a video file, making the image quality lowered, and then after receiving a video code stream, a receiving terminal can use the image super-resolution method to restore the resolution of a video picture, thereby reducing the transmission bandwidth and the storage pressure, and simultaneously ensuring the high resolution of the video picture when the video is played.

FIG. 4 is a flowchart of an image super-resolution method provided in one exemplary embodiment of this disclosure. This embodiment is explained by using an example where the method is applied to a computer device having an image processing function. The method includes the following steps:

Step 401, perform frequency domain transformation on a first image to obtain a spectral feature of the first image.

The spectral feature is used for representing a distribution of a grayscale gradient in the first image. The first image is a blurred image that is subject to super-resolution processing. The first image may be a synthetic image, or may be a real image collected by an image acquisition device.

Image degradation refers to processing a high-resolution image into a low-resolution image through a blur kernel. A specific image degradation process can be described as:

$$I_D = (I_c \downarrow_s) \otimes k + n$$

where $I_c$ represents a high-definition and noise-free high-quality image, $\downarrow_s$ represents down-sampling, k represents a degradation kernel (blur kernel), $\otimes$ represents convolution, n represents noise, and $I_D$ represents a low-definition and noisy image obtained after degradation.

Super-resolution is to process a low-resolution image into a high-resolution image, and is a reverse process of degradation. Therefore, on the basis of the above degradation process, for a super-resolution model R, in the case of non-blind super-resolution, $$I_{SR}^* = R(I_D | k, n)$$

where $I_{SR}^*$ represents a high-definition image obtained after restoration, $I_D$ represents a low-definition and noisy image obtained after degradation, k represents a blur kernel, and n represents noise; and in the case of blind super-resolution, since both k and n are unknown (the blur kernel is unknown and the noise is unknown), it is necessary to predict a degradation kernel $k_{est}$ and then perform non-blind super-resolution processing on a low-definition and noisy image according to the predicted degradation kernel $k_{est}$, such that the result obtained after super-resolution based on the predicted degradation kernel is closer to the result obtained after super-resolution based on an actual degradation kernel.

$$k^* = \underset{k_{est}}{\operatorname{argmin}} \| R(I_D | k_{est}, n_{est}) - I_{SR}^* \|$$

where $n_{est}$ represents predicted noise.

Hence, blind super-resolution processing mainly includes two stages. The first stage is prediction of a blur kernel, and the second stage is non-blind super-resolution processing based on the predicted blur kernel. Since experiments have verified that the frequency domain feature of a degraded image has a strong correlation with the frequency domain feature of a blur kernel corresponding to the degraded image, in the embodiment of this disclosure, blur kernel prediction is performed on the basis of the frequency domain feature of the first image. After obtaining the first image, the computer device first performs frequency domain transformation on the first image to obtain the spectral feature of the first image, so as to subsequently perform blur kernel prediction on the basis of the spectral feature.

In an embodiment, the spectral feature of the first image is obtained by performing Fourier transform on the image. From the experiment result shown in FIG. 3, it can be seen that the spectral features of the images obtained by using FFT are most correlated with the blur kernels. Therefore, in this embodiment, FFT is applied to obtain the spectral feature or spectrogram of the image.

Step 402, perform blur kernel prediction on the basis of the spectral feature to obtain a blur kernel of the first image, the blur kernel being a convolution kernel, for example to be used in performing blur processing on an image.

The blur kernel actually refers to a matrix. After convolving a clear image with a blur kernel, the image becomes blurred, and this is why it is called the blur kernel. The blur kernel is one convolution kernel. The essence of an image convolution operation is matrix convolution. The computer device predicts, on the basis of the spectral feature of the first image and shape and structure correlations between the spectral features of the image and the blur kernel, the blur kernel corresponding to the first image.

In an application scenario of this embodiment, the first image is a low-resolution blurred image. The first image may be obtained after processing a certain high-resolution image by the blur kernel, and accordingly, the blur kernel prediction is to predict the blur kernel necessary for processing the high-resolution image into the low-resolution image. The first image may be a real captured or collected blurred image, and accordingly, the blur kernel prediction is to predict the blur kernel necessary for processing the first image into a high-resolution image. Therefore, the use of the blur kernel prediction method in this embodiment not only can improve the accuracy of blur kernel prediction, but also can achieve blur kernel prediction for blurred images obtained using different methods.

In an embodiment, a kernel prediction model is set to predict, according to the spectral feature of an image, the blur kernel corresponding to the image. A training process for the kernel prediction model can refer to the embodiment below.

Step 403, perform super-resolution processing on the first image on the basis of the blur kernel to generate a super-resolved image, the definition of the super-resolved image being higher than that of the first image. For example, the definition of the super-resolved image may be High Definition (HD) and the definition of the first image may be Standard Definition (SD).

The blur kernel of the first image is predicted in the above step, and then the predicted blur kernel is used as a blur kernel that degrades the high-definition image to the first image to implement non-blind super-resolution processing, thereby obtaining the super-resolved image, the definition of the super-resolved image being higher than that of the first image. In an embodiment, after the computer device performs the super-resolution processing on the first image, the blurred image is transformed into the clear image, and at the same time, the resolution of the first image is improved, the noise of the first image is reduced, etc., thereby obtaining a high-definition and noise-free super-resolved image.

In a case that the generated super-resolved image cannot meet the high-resolution requirement, the super-resolved image can further be used as the first image to perform blur kernel prediction again, and after multiple times of kernel prediction and super-resolution processing, the resolution of the image can be gradually improved.

In summary, in the embodiment of this disclosure, the blur kernel of the first image is estimated on the basis of a frequency domain feature of the image, and the first image is then subjected to super-resolution processing. Since an image and a corresponding blur kernel have shape and structure correlations in respect of the frequency domain feature, compared with image spatial domain-based blur kernel estimation methods, the accuracy of blur kernel prediction can be improved and then the quality of a high-resolution image obtained after super-resolution processing is improved. Moreover, this disclosure is not limited to the blur kernel type and the image type, that is, this disclosure can be applied to super-resolution of both a synthetic image and a real image.

In this disclosure, blur kernel prediction is performed on the basis of the spectral feature of the first image. Specifically, the computer device inputs the spectral feature corresponding to the first image into the kernel prediction model, and the kernel prediction model is used to perform blur kernel prediction. Before the spectral feature is inputted into the kernel prediction model, the computer device first needs to perform image preprocessing on the first image to make the first image meet an input condition of the model. FIG. 5 is a flowchart of an image super-resolution method provided in another exemplary embodiment of this disclosure. This embodiment is explained by using an example where the method is applied to a computer device having an image processing function. The method includes the following steps:

Step 501, perform image preprocessing on a first image to obtain a second image of a first size.

The image preprocessing is used for processing an image size of the first image into a fixed size for input into the model, i.e., the first size, and in the image preprocessing process, original image information other than the image size (such as the image definition) is not changed. In an embodiment, if the size of the first image is the same as the first size, no image preprocessing is performed.

In one possible implementation, the computer device in the embodiment of this disclosure performs blur kernel prediction on the first image on the basis of a neural network model. For the convenience of model feature extraction and information processing, before the blur kernel prediction, it is necessary to preprocess the first image to obtain the second image of a uniform size, such that the size of the second image meets the input condition of the model.

In an embodiment, the computer device pre-stores the first size, and after obtaining the first image, the computer device determines whether the size of the first image meets the first size, if yes, directly performs subsequent frequency domain transformation processing on the first image, and if no, performs image preprocessing on the first image to obtain the second image of the first size.

For example, the first size is represented using the image resolution, for example, the first size is 512 pix*512 pix.

In one possible implementation, the size of the first image may be greater than the first size, or may be less than the first size, and thus the computer device needs to determine an image preprocessing method depending on the actual size of the first image. Step 501 includes the following steps:

Step 501a, in a case that the size of the first image is greater than the first size, perform image cropping on the first image on the basis of the first size to obtain at least two second images.

If the size of the first image is greater than the first size, to obtain the second image of the first size, it is necessary to perform image cropping on the first image to crop the first image into a plurality of second images of the first size.

In one possible implementation, on the one hand, considering that the first size is fixed but the size of the first image may vary, it may not be possible to crop the first image exactly into n complete second images of the first size each time. On the other hand, considering that directly segmenting the first image may cause image contents of the second images to be independent of each other, the difference between the spectral features may lead to differences between the predicted blur kernels, and after the subsequent non-blind super-resolution processing, the effect of the super-resolution processing may be different due to the difference in the blur kernel of each part and then there may be more obvious segmentation lines in the super-resolved image obtained by stitching, the computer device performs image cropping on the first image on the basis of a certain step size to obtain at least two second images, the sizes of the second images being the first size, and the step size being less than the side length in the first size.

For example, as shown in FIG. 6, the computer device performs image cropping on a first image 601 having a size of 1024 pix*1024 pix based on an image cropping box 602 of a first size (512 pix*512 pix). The moving step size of the image cropping box 602 in the horizontal direction is 256 pix, the moving step size of the image cropping box 602 in the vertical direction is also 256 pix, and thus instead of directly cropping the first image to obtain 4 second images, 9 second images are obtained. An intersection area exists between two adjacent second images, and the length of the intersection area in the horizontal direction is a difference between the length of the first size in the horizontal direction and the moving step size (512 pix-256 pix), and the length of the intersection area in the vertical direction is the length (512 pix) of the first size in the vertical direction.

In an embodiment, the computer device directly segments the first image on the basis of the first size, or the computer device uses the above method to control the moving step size to crop the first image. A developer may perform image cropping on the first image in advance according to different moving step sizes, obtain blur kernel prediction and super-resolved image generation results corresponding to different image cropping results through experiments, and then select an optimal moving step size for the first image having said size according to the experimental results. Accordingly, the optimal moving step sizes corresponding to first images of different sizes can be obtained, and the moving step sizes corresponding to the first images of different sizes are stored in the computer device, such that in an actual super-resolution process, an appropriate moving step size can be selected according to the image size of the first image to implement image cropping on the first image, thereby improving the image super-resolution effect. This is not limited in the embodiment of this disclosure.

Step 501b, in a case that the size of the first image is less than the first size, perform image expansion on the first image on the basis of the first size to obtain the second image.

In order to avoid interference of image processing on image information of the original first image, during image expansion on the first image, the first image is copied and stitched to obtain the second image, that is, a copy image of the first image is stitched on the basis of the first image to increase the image size of the first image to the first size such that the image size can be increased and the image information of the original first image is maintained.

When the size of the first image is less than the first size, the computer device performs image expansion on the first image. In order to maintain the degradation strategy for an image unchanged, image expansion is performed through repeat stitching here, that is, if the width of the first image is less than the width in the first size, the first image is copied, the copy image is cropped on the basis of a difference between the two widths, and the image obtained by cropping and the first image are then subjected to transverse stitching, such that the width of the stitched second image is consistent with the width in the first size. Expansion in respect of the height is also performed using the above process.

For example, as shown in FIG. 7, the size of a first image 701 is 450 pix*512 pix, the first size is 512 pix*512 pix, and then the computer device takes an image in a 62 pix*512 pix area on the left side of the first image 701 and copies and stitches the image to the right side of the first image 701 to obtain a second image 702. The computer device can further crop for and copy an image in any 62 pix*512 pix in the first image 701 for copying and stitching, and the image can be stitched on the left or right side of the first image 701.

Step 502, perform frequency domain transformation on the second image to obtain a spectrogram of the second image.

Since in the process of performing image preprocessing on the first image to obtain the second image, only the image size of the first image is changed, and other image information (such as the image definition) related to degradation is not changed, the spectrogram of the second image obtained by performing frequency domain transformation on the second image is similar to a spectrogram of the first image and can be used for representing the spectral feature of the first image for use in subsequent blur kernel prediction.

In one possible implementation, the computer device performs frequency domain transformation on the second image obtained by cropping or expansion to obtain the spectrogram of the second image. Subsequently, the computer device performs blur kernel prediction and super-resolution processing on basis of the second image. That is, the computer device performs blur kernel prediction on the basis of the spectrogram of the second image to obtain a blur kernel corresponding to the second image, performs super-resolution processing on the second image on the basis of the blur kernel to obtain a high-definition image corresponding to the second image, and then crops or stitches the obtained high-definition image to obtain a super-resolved image corresponding to the second image.

In an embodiment, the computer device performs FFT, DWT or DCT on the second image to obtain the spectrogram corresponding to the second image. Since the above experiments have verified that the spectral feature obtained by FFT is more correlated with the spectral feature of the blur kernel than the other methods, the computer device performs discrete fast Fourier transform (DFFT) on the second image obtain the spectrogram. Step 502 includes the following steps:

Step 502a, perform DFFT on the second image to obtain a first spectrogram of the first size.

The second image is a spatial domain image of the first size, the computer device performs DFFT on the second image, and then the first spectrogram of the first size is directly obtained. For example, in a case that the second image is 512 pix*512 pix, the computer device performs DFFT on the second image and the 512 pix*512 pix first spectrogram is obtained.

Step 502*b*, perform down-sampling processing on the first spectrogram to obtain a second spectrogram of a second size.

In order to reduce the prediction efficiency of the kernel prediction model, the first spectrogram of the first size is subjected to down-sampling to reduce the size of the first spectrogram, so as to reduce the calculation amount of the kernel prediction model, that is, the second size of the second spectrogram obtained after down-sampling is less than the first size.

In one possible implementation, the kernel prediction model is used to perform blur kernel prediction in the embodiment of this disclosure. During frequency domain transformation to obtain a spectrogram, in order to make spectral calculation more stable, a great first size (such as 512 pix*512 pix) is usually used; however, a network input of the kernel prediction model usually takes a small calculation amount. Therefore, in order to ensure model prediction performance, it is also necessary to perform down-sampling processing on the first spectrogram to obtain the second spectrogram of the second size, so as to perform blur kernel prediction on the basis of the second spectrogram.

For example, the first size is 512 pix*512 pix, the second size is 256 pix*256 pix, and the computer device performs Bicubic down-sampling on the first spectrogram.

Step 503, input the spectrogram of the second image into a kernel prediction model to obtain the blur kernel outputted by the kernel prediction model.

In one possible implementation, a neural network model is used to perform blur kernel prediction in the embodiment of this disclosure. The computer device inputs the spectrogram of the second image into the kernel prediction model to obtain the blur kernel outputted by the kernel prediction model.

Since in the above embodiment, before the spectrogram of the second image is inputted into the kernel prediction model, the spectrogram of the second image is further subjected to down-sampling processing to obtain the second spectrogram of the second image, during blur kernel prediction, the second spectrogram of the second image needs to be inputted into the kernel prediction model to obtain the blur kernel outputted by the kernel prediction model. Accordingly, step 503 includes: inputting the second spectrogram into the kernel prediction model to obtain the blur kernel outputted by the kernel prediction model.

The spectral feature inputted into the kernel prediction model is the spectrogram of the second image. Further, since there are different relations between the first image and the first size, for example, the size of the first image may be greater than the first size, the first image may be cropped into a plurality of second images, or for example, the size of the first image may be less than the first size, the first image may be copied and stitched into a single second image. Since the image preprocessing method used to change the first image to the second image is different, the specific process of performing blur kernel prediction on the basis of the spectrogram of the second image is also different. The two prediction methods are respectively explained below in the embodiment.

When the size of the first image is greater than the first size, that is, the first image corresponds to at least two second images, step 503 includes the following step:

Step 503*a*, input spectrograms of the second images into the kernel prediction model to obtain blur kernels of the second images.

When the first image is cropped into a plurality of second images, in order to predict the blur kernel corresponding to the first image, it is necessary to perform blur kernel prediction on the plurality of second images. In one possible implementation, the computer device sequentially performs blur kernel prediction on the basis of the second spectrograms of the second images to obtain the blur kernels corresponding to the second images, the number of the blur kernels being the same as the number of the second images. For example, in a case that after the first image is subjected to image cropping, three second images are obtained, including the second image A, the second image B, and the second image C, which respectively correspond to the second spectrogram a, the second spectrogram b, and the second spectrogram c, the computer device inputs the second spectrogram a into the kernel prediction model to obtain the blur kernel 1 outputted by the kernel prediction model, inputs the second spectrogram b into the kernel prediction model to obtain the blur kernel 2 outputted by the kernel prediction model, and inputs the second spectrogram c into the kernel prediction model to obtain the blur kernel 3 outputted by the kernel prediction model, thereby obtaining three blur kernels.

When the size of the first image is less than the first size, that is, the first image corresponds to one second image, step 503 includes the following step:

Step 503*b*, input the spectrogram corresponding to the second images into the kernel prediction model to obtain the blur kernel corresponding to the second image.

Since when the size of the first image is less than the first size, the computer device performs image expansion on the first image to obtain one second image, the computer device directly performs blur kernel prediction on the basis of the second spectrogram of the second image to obtain one blur kernel outputted by the kernel prediction model.

Step 504, perform super-resolution processing on the first image on the basis of the blur kernel to generate a super-resolved image, the definition of the super-resolved image being higher than that of the first image.

In one possible implementation, since the first image is subjected to image preprocessing to obtain the second image and the blur kernel predicted by the kernel prediction model is the blur kernel corresponding to the second image, the computer device performs super-resolution processing on the second image on the basis of the blur kernel to obtain a sub-super-resolved image, and then performs corresponding processing on the sub-resolved image on the basis of the preprocessing method for the first image to obtain the final super-resolved image.

When the size of the first image is greater than the first size, the first image is cropped into a plurality of second images, and different second images correspond to different blur kernels. Therefore, in order to generate a super-resolution result for the first image, it is necessary to obtain super-resolution results for different second images and then fuses said super-resolution images for different second images into the super-resolution result for the first image. Correspondingly, when the size of the first image is greater than the first size, that is, there are at least two second images, step 504 includes the following steps:

Step 504*a*, perform super-resolution processing on the second images on the basis of the blur kernels of the second images to generate first sub-super-resolved images of the second images.

Since the first image is cropped into a plurality of second images, the super-resolved image of the first image is generated by fusing the super-resolved images of the second images. Correspondingly, in one possible implementation, the computer device separately performs blur kernel prediction on the second images through the kernel prediction model to obtain the blur kernels of the second images, and separately performs super-resolution processing on the second images on the basis of the blur kernels corresponding to the second images in the subsequent process to obtain the super-resolved images (first sub-super-resolved images) corresponding to the second images, the number of the first sub-super-resolved images being the same as the number of the second images.

For example, based on the example in step 503, the computer device performs super-resolution processing on the second image a on the basis of the blur kernel 1 to obtain the first sub-super-resolved image a, performs super-resolution processing on the second image b on the basis of the blur kernel 2 to obtain the first super-resolved image b, and performs super-resolution processing on the second image c on the basis of the blur kernel 3 to obtain the first sub-super-resolved image c, so as to generate the super-resolved image corresponding to the first image on the basis of the first sub-super-resolved image a, the first sub-super-resolved image b, and the first sub-super-resolved image c in the subsequent process.

Step 504*b*, perform pixel averaging processing on an intersection area of the first sub-super-resolved images on the basis of an image cropping method for the first image, and fusing the processed first sub-super-resolved images to generate the super-resolved image.

Since the plurality of second images are obtained from the first image through a specific image cropping method, during generating the super-resolved image of the first image on the basis of the first sub-super-resolved images corresponding to the second images, the relation between the first sub-super-resolved images and the super-resolved image also satisfies the specific image cropping method. Therefore, in one possible implementation, the computer device performs image stitching on the first sub-super-resolved images on the basis of the image cropping method for the first image for restoration to obtain the super-resolved image corresponding to the first image.

If the first image is exactly segmented into a plurality of second images, that is, there is no overlap or intersection area between the second images, during generating the super-resolved image of the first image on the basis of the first sub-super-resolved images of the second images, the super-resolved image of the first image can be generated only by performing image stitching on the first sub-super-resolved images according to the positions of the second images in the first image.

Since the computer device may not directly segment the first image to obtain the second images, in the image cropping process, there may be intersection areas between adjacent second images, and then the computer device performs image stitching on the first sub-super-resolved images according the positional corresponding relationship between the second images, and performs pixel averaging processing on the intersection areas between the first sub-super-resolved images to obtain the super-resolved image.

For example, for the example shown in FIG. 6, the computer device performs super-resolution processing to obtain nine first sub-super-resolved images, and then stitches and synthesizes the nine sub-super-resolved images into one image according to the image cropping method shown in the figure and the corresponding relationship between the second images and the first sub-resolved images, and in the synthesis process, the overlapping portions between the first sub-super-resolved images are subjected to pixel averaging processing.

In one possible implementation, if the size of the first image is less than the first size, that is, the first image only corresponds to one second image or the second image includes the complete first image, step 504 includes the following steps:

Step 504*c*, perform super-resolution processing on the second image on the basis of the blur kernel to generate a second sub-super-resolved image.

Since the first image only corresponds to one second image and the second image includes the complete first image, the second sub-super-resolved image generated on the basis of the second image also includes the super-resolved image of the first image. Correspondingly, in one possible implementation, the computer device predicts the blur kernel of the second image on the basis of the second spectrogram of the second image, and performs super-resolution processing on the second image on the basis of the blur kernel to obtain a super-resolved image (second sub-super-resolved image) of the second image. On the basis of the relation between the second image and the first image, the second sub-super-resolved image is equivalently obtained by performing image expansion on the super-resolved image of the first image according to a certain method, that is, the second sub-super-resolved image also includes the super-resolved image of the first image.

Step 504*d*, perform image cropping on the second sub-super-resolved image on the basis of an image expansion method for the first image to generate the super-resolved image.

Since the second image is obtained by performing image expansion on the first image, that is, the second image=the first image+the copy and stitched image, accordingly, during generating the super-resolved image of the first image, the super-resolved image of the first image can be obtained by subtracting a super-resolved image corresponding to the copy and stitched image from the second sub-super-resolved image. Correspondingly, the computer device performs a reverse operation on the second sub-super-resolved image on the basis of the image expansion method for the first image, and crops out, according to the position of the first image in the second image, the second sub-super-resolved image from the super-resolved image corresponding to the first image. For example, based on the example shown in FIG. 7, the computer device performs super-resolution processing to obtain the second sub-super-resolved image corresponding to the second image 702, and then crops out and removes the image in the 62 pix*512 pix portion on the right side of the second sub-super-resolved image, and the reversed portion is the super-resolved image.

In the embodiment of this disclosure, the computer device performs image preprocessing on the first image to obtain the second images of the uniform size, and then inputs the spectrograms of the second images into the kernel prediction model for blur kernel prediction, such that the spectrograms inputted into the model meet the requirement of the model for inputted data, and the model can perform prediction on the basis of the spectrograms of the same size. Moreover, in a case that the size of the first image is greater than the first size, the step size of cropping for the first image is less than the side length corresponding to the first size, such that there are intersections between adjacent second images, and after the first sub-super-resolved images corresponding to the second images are obtained, the first sub-super-resolved images are stitched and restored on the basis of the image cropping method, and the intersection areas are subjected to pixel averaging, such that the situation where direct segmentation of the first image leads to differences in the spectral features between the second images, resulting in differences between blur kernels and resulting in an obvious segmentation trace in the stitched super-resolved image can be avoided.

The above embodiment shows a process of the computer device performing image preprocessing on the first image to obtain the spectrogram and inputting the spectrogram into the kernel prediction model for blur kernel prediction. In one possible implementation, a kernel prediction model is a generative network (generator) and includes at least one convolution layer and at least one transposed convolution layer, and the number of the convolution layers is consistent with the number of the transposed convolution layers. FIG. 8 is a flowchart of an image super-resolution method provided in another exemplary embodiment of this disclosure. This embodiment is explained by using an example where the method is applied to a computer device having an image processing function. The method includes the following steps:

Step 801, perform image preprocessing on a first image to obtain a second image of a first size.

Step 802, perform frequency domain transformation on the second image to obtain a spectrogram of the second image.

Specific implementations of step 801 to step 802 can refer to steps 501 to step 502 above. Details are not described again in the embodiment of this disclosure.

Step 803, perform convolution processing on the spectrogram through the at least one convolution layer in the kernel prediction model to obtain a feature vector of the spectrogram.

In one possible implementation, the model architecture of the kernel prediction model is as shown in FIG. 9. First, a convolution 2-dimension (Conv2d) layer is included, and the convolution layer, serving as an input layer, convolves the spectrogram to a size allowing calculation by the model; then seven convolution modules 901 are included, each convolution module 901 includes one Conv2d, one normalization function (BatchNorm 2-Dimension (BatchNorm2d)), and a recited non-linear function (Leaky Rectified Linear Unit (LeakyReLU)), and the computer device performs convolution processing on the spectrogram through the seven convolution modules 901 to obtain the feature vector corresponding to the spectrogram.

Step 804, perform transposed convolution processing on the feature vector through the at least one transposed convolution layer to output the blur kernel.

As shown in FIG. 9, in the kernel prediction model, seven transposed convolution modules 902 are connected after the convolution modules, and each transposed convolution module 902 includes a rectified linear unit (ReLU), a transposed convolution layer (ConvTranspose2d), and one BatchNorm2d. The computer device performs transposed convolution processing on the feature vector on the basis of the seven transposed convolution modules 902 to output the blur kernel.

Step 805, input the first image and the blur kernel into a non-blind super-resolution model to obtain a super-resolved image outputted by the non-blind super-resolution model.

The non-blind super-resolution model is a spatial feature transform for multiple degradations (SFTMD) network or a residual channel attention network (RCAN). The kernel prediction model and the non-blind super-resolution model are combined to obtain a model for performing blind super-resolution processing on images.

The non-blind super-resolution model refers to performing super-resolution processing on the first image through the non-blind super-resolution model to generate the super-resolved image of the first image in a case that the blur kernel is known, where the blur kernel is the blur kernel calculated in the embodiment.

In an embodiment, in a case that the super-resolved image of the first image is obtained by stitching a plurality of first sub-super-resolved images or by performing image cropping on a second sub-super-resolved image, the computer device needs to input the second image and the blur kernel corresponding to the second image to the non-blind super-resolution model to obtain the plurality of sub-super-resolved images outputted by the non-blind super-resolution model (corresponding to the case where the first image is cropped to a plurality of second images); or, a single second sub-super-resolved image outputted by the non-blind super-resolution model is obtained (corresponding to the case where the first image is subjected to image expansion to obtain a single second image).

In the embodiment of this disclosure, by configuring a plurality of convolution modules and the corresponding number of transposed convolution modules in the kernel prediction model, the spectral feature of the first image is extracted and then transposed convolution is performed to obtain the corresponding blur kernel, thereby achieving prediction of the blur kernel. The kernel prediction model and the non-blind super-resolution model are combined to achieve super-resolution processing on the first image.

The above embodiment shows a process of the computer device processing the spectral feature corresponding to the first image by using the kernel prediction model to obtain the blur kernel; however, before actual application, it is necessary to perform model training on a kernel prediction model on the basis of a frequency domain feature of a sample image, such that the kernel prediction model has the function of predicting a blur kernel on the basis of a spectral feature. FIG. 10 is a flowchart of an image super-resolution method provided in one exemplary embodiment of this disclosure. This embodiment is explained by using an example where the method is applied to a computer device having an image processing function and a model training function. The method includes the following steps:

Step 1001, perform frequency domain transformation on a first sample image to obtain a sample spectral feature of the first sample image, the sample spectral feature being used for representing a distribution of a grayscale gradient in the first sample image.

During training a kernel prediction model, it is necessary to use a real blur kernel corresponding to a sample image for supervision, such that a blur kernel of the first sample image is known. Therefore, in one possible implementation, the first sample image is a blurred image processed by the blur kernel in advance, that is, during training the kernel prediction model, a training sample set includes the first sample image and the real blur kernel corresponding to the first sample image. Since the above embodiments have verified that the frequency domain feature of a degraded image has a strong correlation with the frequency domain feature of a blur kernel corresponding to the degraded image, in the embodiment of this disclosure, the computer device performs blur kernel prediction and model training on the basis of the spectral feature of the first sample image.

Step 1002, input the sample spectral feature into the kernel prediction model to obtain a predicted blur kernel outputted by the kernel prediction model, the predicted blur kernel being a convolution kernel, for example to be used in performing blur processing on an image.

A neural network model is used to perform blur kernel prediction in the embodiment of this disclosure. The computer device inputs the sample spectral feature of the first sample image into the kernel prediction model to obtain the predicted blur kernel outputted by the kernel prediction model. In one possible implementation, the kernel prediction model is a generative network (generator), the predicted blur kernel is generated on the basis of an inputted sample spectral feature matrix, and the predicted blur kernel is the blur kernel of the first sample image generated by prediction of the kernel prediction model.

Step 1003, perform iterative training on the kernel prediction model on the basis of the predicted blur kernel and the real blur kernel, the real blur kernel being the blur kernel used in generating the first sample image.

The computer device performs iterative training on the kernel prediction model on the basis of the real blur kernel used in performing blur processing on an image to obtain the first sample image and the predicted blur kernel outputted by the kernel prediction model in the previous step, until the model converges.

In one possible implementation, since image super-resolution processing further needs to be performed in the subsequent process, after training of the kernel prediction model is completed, the computer device further performs model training on a non-bind super-resolution model on the basis of the predicted blur kernel outputted by the kernel prediction model and the high-definition image used to generate the first sample image, so as to complete training of an entire image super-resolution model.

In the embodiment of this disclosure, a sample blur kernel of a first sample image is estimated on the basis of a frequency domain feature of the first sample image, and the first sample image is then subjected to super-resolution processing. Since an image and a corresponding blur kernel have shape and structure correlations in respect of the frequency domain feature, compared with image spatial domain-based blur kernel estimation methods, by performing model training on the basis of the frequency domain feature of the first sample image, the accuracy of blur kernel prediction can be improved and then the quality of a high-resolution image obtained after super-resolution processing is improved.

Figure 11:
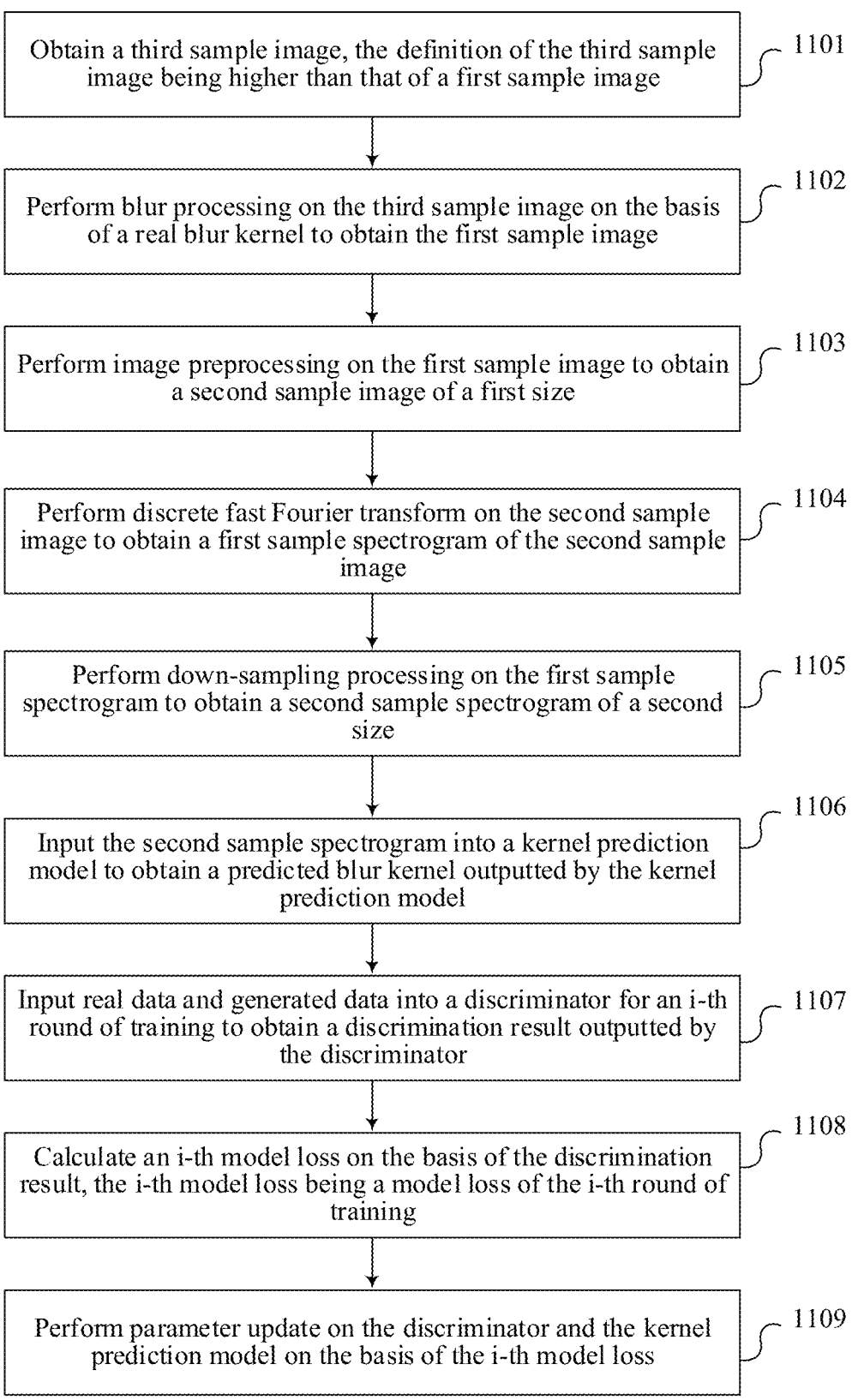
FIG. 11 is a flowchart of an image super-resolution method provided in another exemplary embodiment of this disclosure.

The computer device first performs blur processing on the high-quality image to obtain the first sample image, and then performs model training on the kernel prediction model on the basis of the predicted blur kernel outputted by the model and the real blur kernel used in generating the first sample image, such that the kernel prediction model gradually generates the predicted blur kernel closer to the real blur kernel. FIG. 11 is a flowchart of an image super-resolution method provided in another exemplary embodiment of this disclosure. This embodiment is explained by using an example where the method is applied to a computer device having an image processing function and a model training function. The method includes the following steps:

Step 1101, obtain a third sample image, the definition of the third sample image being higher than that of the first sample image.

In the model training stage, since the real blur kernel needs to be used for training control, the high-definition image is subjected to blur processing by using the real blur kernel to obtain the first sample image, such that it can be ensured that the blur kernel corresponding to the first sample image is known. In one possible implementation, the computer device first obtains a sample high-definition image (third sample image), and performs blur processing on the third sample image according to the real blur kernel to generate the first sample image, such that the definition of the third sample image is necessarily higher than that of the first sample image; and uses the first sample image and the real blur kernel as training data of the kernel prediction model. The sample high-definition image (third sample image) may be a high-definition computer synthetic image, or may be a real captured high-definition image. In one possible implementation, the computer device obtains various sample high-definition images (third sample image) from an image database.

Step 1102, perform blur processing on the third sample image on the basis of the real blur kernel to obtain the first sample image.

The computer device performs blur processing on the third sample image on the basis of the real blur kernel to obtain the blurred low-quality first sample image. In one possible implementation, in order to improve the prediction performance of the model to allow the model to predict various blur kernels, the computer device may perform blur processing on the third sample image by using multiple types of real blur kernels, for example, performing blur processing on the same third sample image separately by using multiple types of Gaussian kernels and motion kernels to obtain a large number of first sample images.

In other possible implementations, a related person can also only select, according to actual image super-resolution requirements, a single type of blur kernel to perform blur processing on the third sample image to generate the third sample image, and use the third sample image and the real blur kernel as training data to train the kernel prediction model, such that the kernel prediction model has high kernel prediction accuracy for r-the single type of blur kernel, thereby avoiding the influence of other types of blur kernels on the prediction performance of the kernel prediction model. For example, if there are prediction accuracy requirements for the motion kernel, it is allowable to only use multiple types of motion kernels to perform blur processing on the third sample image to obtain the first ample image, such that the kernel prediction model trained using the first sample image and the motion kernels (real blur kernel) has a high accurate prediction capability for the motion kernel.

Step 1103, perform image preprocessing on the first sample image to obtain a second sample image of a first size.

The image preprocessing is used for processing an image size of the first sample image into the first size.

For the convenience of model feature extraction and information processing, before the blur kernel prediction, it is necessary to preprocess the first sample image to obtain the second image of a uniform size, such that the size of the second sample image meets the input condition of the model.

For example, the first size is represented using the image resolution, for example, the first size is 512 pix*512 pix.

In one possible implementation, the size of the first sample image may be greater than the first size, or may be less than the first size, and thus the computer device needs to determine an image preprocessing method depending on the actual size of the first sample image. Step 1103 includes the following steps:

Step 1103a, in a case that the size of the first sample image is greater than the first size, perform image cropping on the first sample image on the basis of the first size to obtain at least two second sample images.

If the size of the first sample image is greater than the first size, in order to obtain the second sample image of the first size, it is necessary to perform image cropping on the first sample image. In one possible implementation, on the one hand, considering that the first size is fixed but the size of the first sample image may vary, it may not be possible to crop the first sample image exactly into n complete second sample images of the first size each time. On the other hand, considering that directly segmenting the first sample image may cause image contents of the second sample images to be independent of each other, the difference between the spectral features may lead to differences between the predicted blur kernels, and after the subsequent non-blind super-resolution processing, the effect of the super-resolution processing may be different due to the difference in the blur kernel of each part and then there may be more obvious segmentation lines in the super-resolved image obtained by stitching, the computer device performs image cropping on the first sample image on the basis of a certain moving step size to obtain at least two second sample images, the sizes of the second images being the first size, and the moving step size being less than the side length in the first size.

The computer device may directly segment the first sample image on the basis of the first size, or the computer device may control the moving step size to crop the first sample image. In order to enrich the diversity of the second sample images obtained by cropping so that the kernel prediction model has a better blur kernel prediction capability for various image clipping methods in the subsequent process, the computer device can use different moving step sizes to perform image cropping on the first sample image to obtain different second sample images after cropping. For example, image cropping is performed on the first sample image having a size of 1024 pix*1024 pix based on an image cropping box of the first size (512 pix*512 pix). The moving step size of the image cropping box in the horizontal direction is 256 pix, the moving step size of the image cropping box in the vertical direction is also 256 pix, and thus by correspondingly using the moving step size to crop the first sample image, nine second sample images can be obtained; If the moving step size is 128 pix, the moving step size in the vertical direction is not 128 pix, and thus by using the moving step size to crop the first sample image, 64 second sample images can be obtained.

Step 1103b, in a case that the size of the first sample image is less than the first size, perform image expansion on the first sample image on the basis of the first size to obtain the second sample image.

When the size of the first sample image is less than the first size, the computer device performs image expansion on the first sample image. In order to maintain the degradation strategy for an image unchanged, image expansion is performed on the first sample image through repeat stitching here, that is, if the width of the first sample image is less than the width in the first size, the first sample image is copied, the copy image is cropped on the basis of a difference between the two widths, and the image obtained by cropped and the first sample image are then subjected to transverse stitching, such that the width of the stitched second sample image is consistent with the width in the first size. Image expansion in respect of the height is also performed using the above process.

Step 1104, perform DFFT on the second sample image to obtain a first sample spectrogram of the second sample image.

In an embodiment, the computer device performs FFT, DWT or DCT on the second sample image to obtain the spectrogram of the second sample image. Since the above experiments have verified that the spectral feature obtained by FFT is more correlated with the spectral feature of the blur kernel than the other methods, the computer device performs DFFT on the second sample image to obtain the first sample spectrogram of the first size.

Step 1105, perform down-sampling processing on the first sample spectrogram to obtain a second sample spectrogram of a second size.

The second size is less than the first size.

In one possible implementation, the kernel prediction model is used to perform blur kernel prediction in the embodiment of this disclosure. During frequency domain transformation to obtain a sample spectrogram, in order to make spectral calculation more stable, a great first size (such as 512 pix*512 pix) is usually used; however, a network input of the kernel prediction model usually takes a small calculation amount. Therefore, in order to ensure model prediction performance, it is also necessary to perform down-sampling processing on the first sample spectrogram to obtain the second sample spectrogram of the second size, so as to perform blur kernel prediction on the basis of the second sample spectrogram.

For example, the first size is 512 pix*512 pix, the second size is 256 pix*256 pix, and the computer device performs Bicubic down-sampling on the first sample spectrogram.

Step 1106, input the second sample spectrogram into the kernel prediction model to obtain the predicted blur kernel outputted by the kernel prediction model.

The computer device inputs the second sample spectrogram corresponding to each second sample image into the kernel prediction model to obtain the predicted blur kernel corresponding to each second sample image. If a plurality of second sample images are obtained from the first sample image by image cropping, the second sample spectrograms of the plurality of second sample images need to be inputted into the kernel prediction model to obtain a plurality of predicted blur kernels outputted by the kernel prediction model, the number of the predicted blur kernels being the same as the number of the second sample images; and if a single second sample image is obtained from the first sample image by image expansion, it only requires to input the second sample spectrogram of the single second sample image into the kernel prediction model to obtain a single predicted blur kernel outputted by the kernel prediction model.

Step 1107, input real data and generated data into a discriminator for an i-th round of training to obtain a discrimination result outputted by the discriminator.

The real data is obtained on the basis of the real blur kernel, the generated data is obtained on the basis of the predicted blur kernel, the discrimination result is used for indicating a probability that the input data is the real data, and i is a positive integer.

In one possible implementation, the discriminator is introduced in the embodiment of this disclosure, and performance improvement of the kernel prediction model is achieved by mutual training and contest between the kernel prediction model (generator) and the discriminator. The computer device performs blur kernel prediction on the basis of the kernel prediction model, inputs the generated data corresponding to the predicted blur kernel into the discriminator, and inputs the real data corresponding to the real blur kernel into the discriminator, and the discriminator is used for determining the inputted data to determine the probability that the inputted data is the real data. In the training process, it is necessary to continuously improve the discriminative performance of the discriminator so that the discriminator can correctly determine the type of the inputted data. On the other hand, it is necessary to train the kernel prediction model so that the predicted blur kernel outputted by the kernel prediction model is deceptive and can interfere with the determination of the discriminator. When the discriminator cannot determine whether the inputted data is real data (that is, the probability is close to 0.5), it is determined that the model training is completed.

Figure 12:
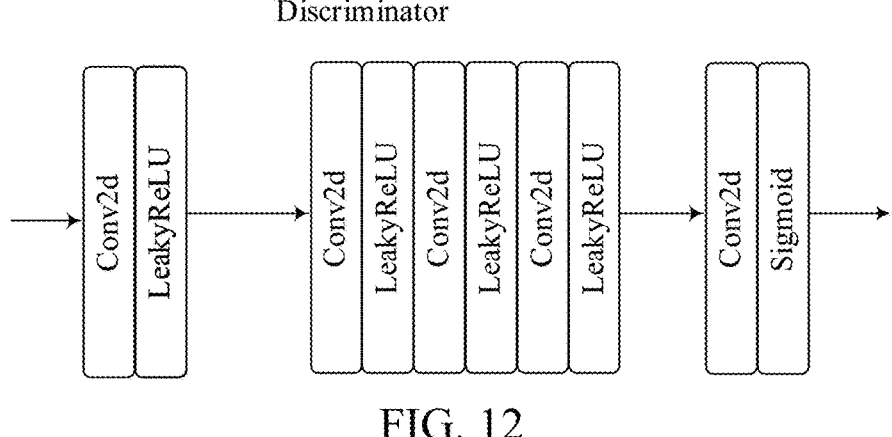
FIG. 12 is a structural block diagram of a discriminator provided in one exemplary embodiment of this disclosure.

For example, FIG. 12 is a structural block diagram of a discriminator. The discriminator consists of Conv2d layers and activation functions (LeakReLU) which are arranged alternately, and is used for classifying inputted data and determining the probability that the inputted data is real data.

In an embodiment, the computer device directly uses the predicted blur kernel as the generated data and uses the real blur kernel as the real data for model training. Alternatively, in order to further improve model performance and accelerate model training, the computer device inputs more image information to the discriminator for determination. Before step 1107, the image super-resolution method provided in the embodiment of this disclosure further includes the following step:

performing image stitching on the predicted blur kernel and a sample spectrogram to obtain the generated data, and performing image stitching on the real blur kernel and the sample spectrogram to obtain the real data, the sample spectrogram being used for representing the sample spectral feature of the first sample image. In an embodiment, if the first sample image needs to be subjected to image preprocessing, the sample spectrogram is the second sample spectrogram of the second sample image obtained after the image preprocessing; and if the first sample image does not need to be subjected to image preprocessing, the sample spectrogram is the sample spectrogram of the first sample image.

For the case where the first sample image needs to be subjected to image preprocessing, depending on the image size of the first sample image, there are also two cases: if the first sample image is cropped into a plurality of second sample images, a plurality of predicted blur kernels can be predicted by the kernel prediction model, and during image stitching according to the predicted blur kernels and the sample spectrograms, to the method includes stitching each predicted blur kernel and the corresponding second sample spectrogram thereof and stitching the stitching results of the different predicted blur kernels to obtain the generated data; and if the first sample image is expanded to a single second sample image, to the method includes performing image stitching on a single second sample spectrogram and a single predicted blur kernel to obtain the generated data.

In one possible implementation, the computer device stitches the predicted blur kernel and the corresponding sample spectrogram (second sample spectrogram) on the basis of a corresponding relationship between the predicted blur kernel and the sample spectrogram to obtain the generated data, and stitches the real blur kernel and the corresponding sample spectrogram on the basis of a corresponding relationship between the real blur kernel and the sample spectrogram to obtain the real data. The sample spectrogram is single-channel image data, the real blur kernel and the predicted blur kernel are also single-channel data, and the stitching process of the computer device is the process of superimposing the two data to obtain dual-channel data.

The computer device inputs the real data and the generated data into the discriminator for the i-th round of training to obtain the discrimination result of the discriminator. The discrimination result is the probability that the inputted data belongs to the real data.

Step 1108, calculate an i-th model loss on the basis of the discrimination result, the i-th model loss being a model loss of the i-th round of training.

The computer device calculates a model loss on the basis of a loss function. In one possible implementation, the loss function corresponding to the kernel prediction model and the discriminator is a cross-entropy loss function. Step 1108 includes the following steps:

Step 1108a, in a case that a model parameter of the kernel prediction model in the cross-entropy loss function is constant, calculate an i-th model loss of the discriminator on the basis of the discrimination result of the discriminator for the real data and the generated data, the i-th loss model of the discriminator being greater than an (i−1)th model loss of the discriminator.

For example, the cross-entropy loss function can be represented as:

$$L(G,D)=\Sigma E(\log Dd)+E(\log(1-D(G(p))))$$

where G represents the generator (i.e., the kernel prediction model), D represents the discriminator, d represents the real data, Dd represents the discrimination result of the discriminator for the real data, G(p) represents the generated data, and D(G(p)) represents the discrimination result of the discriminator for the generated data.

During training the discriminator, G is constant, and in this case the greater the value of the first term, the higher the discrimination capability of the discriminator for the real data, and the closer the D(G(P)) is to 0, that is, the greater the value of the second item, the higher the discrimination capability of the discriminator for the generated data. Accordingly, during training the discriminator, the greater the model loss, the better.

Step 1108b, in a case that a model parameter of the discriminator in the cross-entropy loss function is constant, calculate an i-th model loss of the kernel prediction model on the basis of the discrimination result of the discriminator for the generated data, the i-th model loss of the kernel prediction model being less than an (i−1)th model loss of the kernel prediction model.

On the contrary, during training the generator, D is fixed, and in this case, the first term is a constant term, the closer the D(G(p)) is to 1, the closer the generated data is to the real data. Accordingly, during training the generator, the less the model loss, the better.

Step 1109, perform parameter update on the discriminator and the kernel prediction model on the basis of the i-th model loss.

The computer device updates model parameters of the discriminator and the kernel prediction model on the basis of the i-th model loss and a parameter update direction for the next round of model training, until model training is completed.

Figure 13:
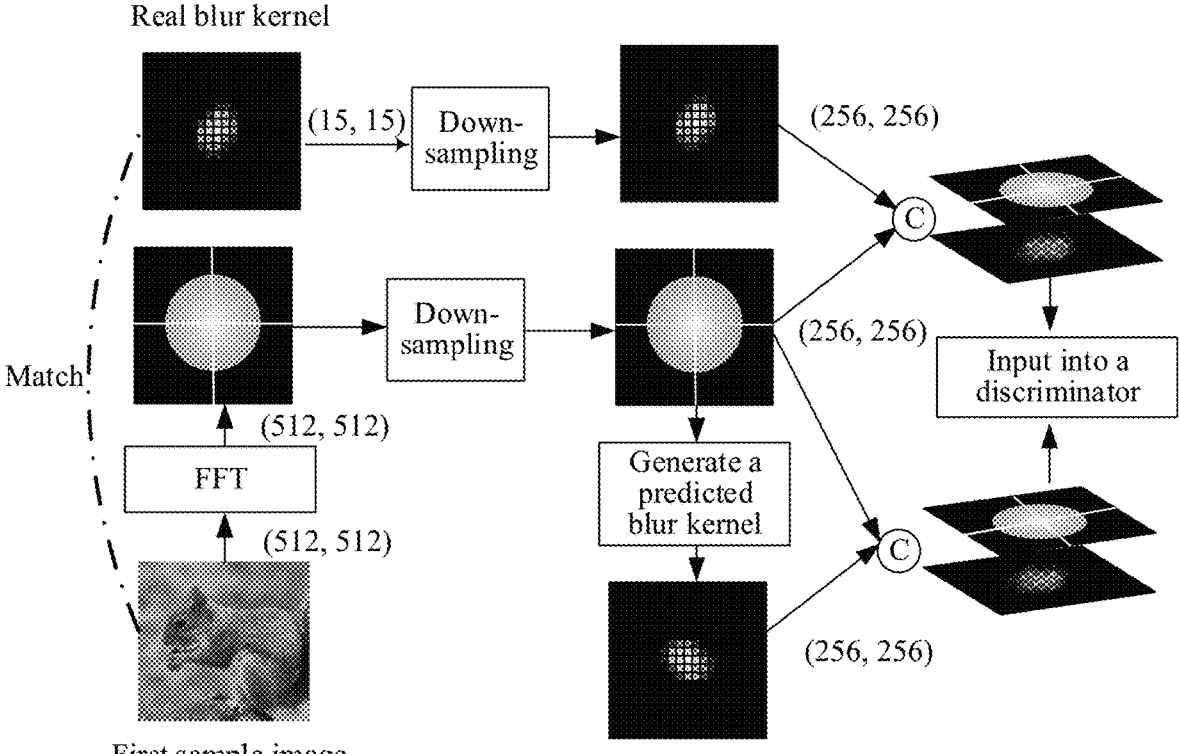
FIG. 13 is a schematic diagram of a model training process provided in one exemplary embodiment of this disclosure.

FIG. 13 shows a model training process. First, the first sample image is preprocessed to obtain the second sample image having the size of 512 pix*512 pix; then the second sample image is subjected to FFT to obtain the first sample spectrogram; the first sample spectrogram is subjected to down-sampling processing (such as Bicubic down-sampling) to obtain the second sample spectrogram of the second size (256 pix*256 pix); the second sample spectrogram is inputted into the kernel prediction model to generate the predicted blur kernel; the predicted blur kernel and the second sample spectrogram are stitched to obtain the generated data; the real blur kernel obtained after up-sampling processing and the second sample spectrogram are stitched to obtain the real data; and the real data and the generated data are inputted into the discriminator to obtain the discrimination result, so as to perform the next round of training on the basis of the discrimination result.

In the embodiment of this disclosure, on the basis of the GAN, by using the discriminator to perform model training on the kernel prediction model and making the kernel prediction model and the discriminator learn from each other through contest, the blur kernel predicted by the trained kernel prediction model is closer to the real blur kernel, the prediction capability of the model is improved, and then the quality of the super-resolved image is improved.

Figures 14, 15:
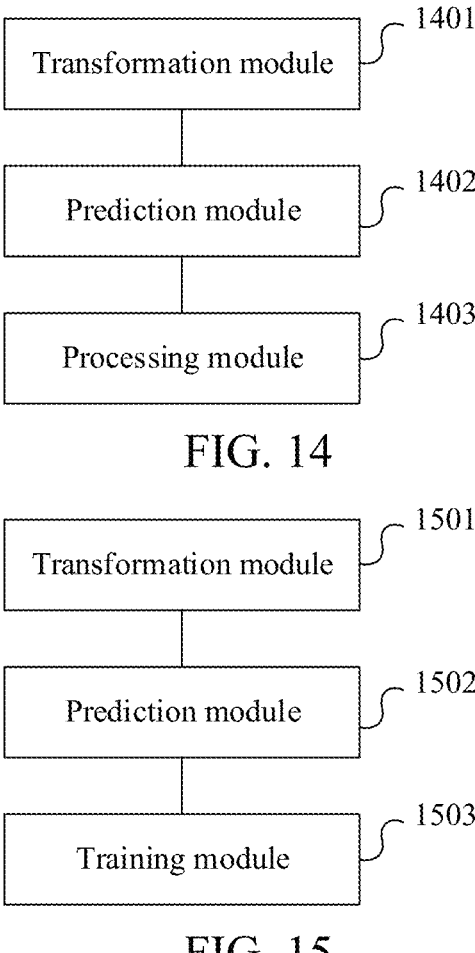
FIG. 14 is a structural block diagram of an image super-resolution apparatus provided in one exemplary embodiment of this disclosure.
FIG. 15 is a structural block diagram of an image super-resolution apparatus provided in another exemplary embodiment of this disclosure.

FIG. 14 is a structural block diagram of an image super-resolution apparatus provided in one exemplary embodiment of this disclosure. The apparatus includes:

a transformation module 1401, configured to perform frequency domain transformation on a first image to obtain a spectral feature of the first image, the spectral feature being used for representing a distribution condition of a grayscale gradient of the first image;

a prediction module 1402, configured to perform blur kernel prediction on the basis of the spectral feature to obtain a blur kernel of the first image, the blur kernel being a convolution kernel used in performing blur processing on an image; and a processing module 1403, configured to perform super-resolution processing on the first image on the basis of the blur kernel to generate a super-resolved image, the definition of the super-resolved image being higher than that of the first image.

In an embodiment, the transformation module 1401 is further configured to:

perform image preprocessing on the first image to obtain a second image of a first size, the image preprocessing being used for processing an image size of the first image into the first size; and perform frequency domain transformation on the second image to obtain a spectrogram of the second image, the spectrogram being used for representing the spectral feature; and the prediction module 1402 is further configured to:

input the spectrogram of the second image into a kernel prediction model to obtain the blur kernel outputted by the kernel prediction model.

In an embodiment, the transformation module 1401 is further configured to:

in a case that the size of the first image is greater than the first size, perform image cropping on the first image on the basis of the first size to obtain at least two second images;

the prediction module 1402 is further configured to:

input spectrograms of the second images into the kernel prediction model to obtain blur kernels of the second images; and the processing module 1403 is further configured to:

perform super-resolution processing on the second images on the basis of the blur kernels of the second images to generate first sub-super-resolved images of the second images; and perform pixel averaging processing on an intersection area of the first sub-super-resolved images on the basis of an image cropping method for the first image, and fuse the processed first sub-super-resolved images to generate the super-resolved image.

In an embodiment, the transformation module 1401 is further configured to:

in a case that the size of the first image is less than the first size, perform image expansion on the first image on the basis of the first size to obtain the second image, the image expansion being used for performing copying and splicing processing on the first image;

the prediction module 1402 is further configured to:

input the spectrogram of the second image into the kernel prediction model to obtain a blur kernel of the second image; and the processing module 1403 is further configured to:

perform super-resolution processing on the second image on the basis of the blur kernel to generate a second sub-super-resolved image; and perform image cropping on the second sub-super-resolved image on the basis of an image expansion method for the first image to generate the super-resolved image.

In an embodiment, the transformation module 1401 is further configured to:

perform DFFT on the second image to obtain a first spectrogram of the first size; and perform down-sampling processing on the first spectrogram to obtain a second spectrogram of a second size, the second size being less than the first size; and the prediction module 1402 is further configured to:

input the second spectrogram into the kernel prediction model to obtain the blur kernel outputted by the kernel prediction model.

In an embodiment, the kernel prediction model includes at least one convolution layer and at least one transposed convolution layer, and the number of the convolution layers is consistent with the number of the transposed convolution layers; and the prediction module 1402 is further configured to:

perform convolution processing on the spectrogram through the at least one convolution layer in the kernel prediction model to obtain a feature vector of the spectrogram; and perform transposed convolution processing on the feature vector through the at least one transposed convolution layer to output the blur kernel.

In an embodiment, the processing module 1403 is further configured to:

input the first image and the blur kernel into a non-blind super-resolution model to obtain the super-resolved image outputted by the non-blind super-resolution model, the non-blind super-resolution model being an SFTMD network or an RCAN.

FIG. 15 is a structural block diagram of an image super-resolution apparatus provided in one exemplary embodiment of this disclosure. The apparatus includes:

a transformation module 1501, configured to perform frequency domain transformation on a first sample image to obtain a sample spectral feature of the first sample image, the sample spectral feature being used for representing a distribution condition of a grayscale gradient of the first sample image;

a prediction module 1502, configured to input the sample spectral feature into a kernel prediction model to obtain a predicted blur kernel outputted by the kernel prediction model, the predicted blur kernel being a convolution kernel used in performing blur processing on an image; and a training module 1503, configured to perform iterative training on the kernel prediction model on the basis of the predicted blur kernel and a real blur kernel, the real blur kernel being a blur kernel used in generating the first sample image.

In an embodiment, the training module 1503 is further configured to:

input real data and generated data into a discriminator for an i-th round of training to obtain a discrimination result outputted by the discriminator, the real data being obtained on the basis of the real blur kernel, the generated data being obtained on the basis of the predicted blur kernel, the discrimination result being used for indicating a probability that the input data is the real data, and i being a positive integer;

calculate an i-th model loss on the basis of the discrimination result, the i-th model loss being a model loss of the i-th round of training; and perform parameter update on the discriminator and the kernel prediction model on the basis of the i-th model loss.

In an embodiment, the apparatus further includes:

a stitching module, configured to perform image stitching on the predicted blur kernel and a sample spectrogram to obtain the generated data, and perform image stitching on the real blur kernel and the sample spectrogram to obtain the real data, the sample spectrogram being used for representing the sample spectral feature of the first sample image.

In an embodiment, a loss function of the kernel prediction model and the discriminator is a cross-entropy loss function; and the training module 1503 is further configured to:

in a case that a model parameter of the kernel prediction model in the cross-entropy loss function is constant, calculate an i-th model loss of the discriminator on the basis of the discrimination result of the discriminator for the real data and the generated data, the i-th loss model of the discriminator being greater than an (i−1)th model loss of the discriminator; and in a case that a model parameter of the discriminator in the cross-entropy loss function is constant, calculate an i-th model loss of the kernel prediction model on the basis of the discrimination result of the discriminator for the generated data, the i-th model loss of the kernel prediction model being less than an (i−1)th model loss of the kernel prediction model.

In an embodiment, the transformation module 1501 is further configured to:

perform image preprocessing on the first sample image to obtain a second sample image of a first size, the image preprocessing being used for processing an image size of the first sample image into the first size;

perform DFFT on the second sample image to obtain a first sample spectrogram of the second sample image; and perform down-sampling processing on the first sample spectrogram to obtain a second sample spectrogram of a second size, the second size being less than the first size; and the prediction module 1502 is further configured to:

input the second sample spectrogram into the kernel prediction model to obtain the predicted blur kernel outputted by the kernel prediction model.

In an embodiment, the transformation module 1501 is further configured to:

in a case that the size of the first sample image is greater than the first size, perform image cropping on the first sample image on the basis of the first size to obtain at least two second sample images; and in a case that the size of the first sample image is less than the first size, perform image expansion on the first sample image on the basis of the first size to obtain the second sample image, the image expansion being used for performing copying and stitching processing on the first sample image.

In an embodiment, the apparatus further includes:

an obtaining module, configured to obtain a third sample image, the definition of the third sample image being higher than that of the first sample image; and a processing module, configured to perform blur processing on the third sample image on the basis of the real blur kernel to obtain the first sample image.

In summary, in the embodiment of this disclosure, the blur kernel of the first image is estimated on the basis of a frequency domain feature of the image, and the first image is then subjected to super-resolution processing. Since an image and a corresponding blur kernel have shape and structure correlations in respect of the frequency domain feature, compared with image spatial domain-based blur kernel estimation methods, the accuracy of blur kernel prediction can be improved and then the quality of a high-resolution image obtained after super-resolution processing is improved. Moreover, this disclosure is not limited to the blur kernel type and the image type, that is, this disclosure can be applied to super-resolution of both a synthetic image and a real image.

Figure 16:
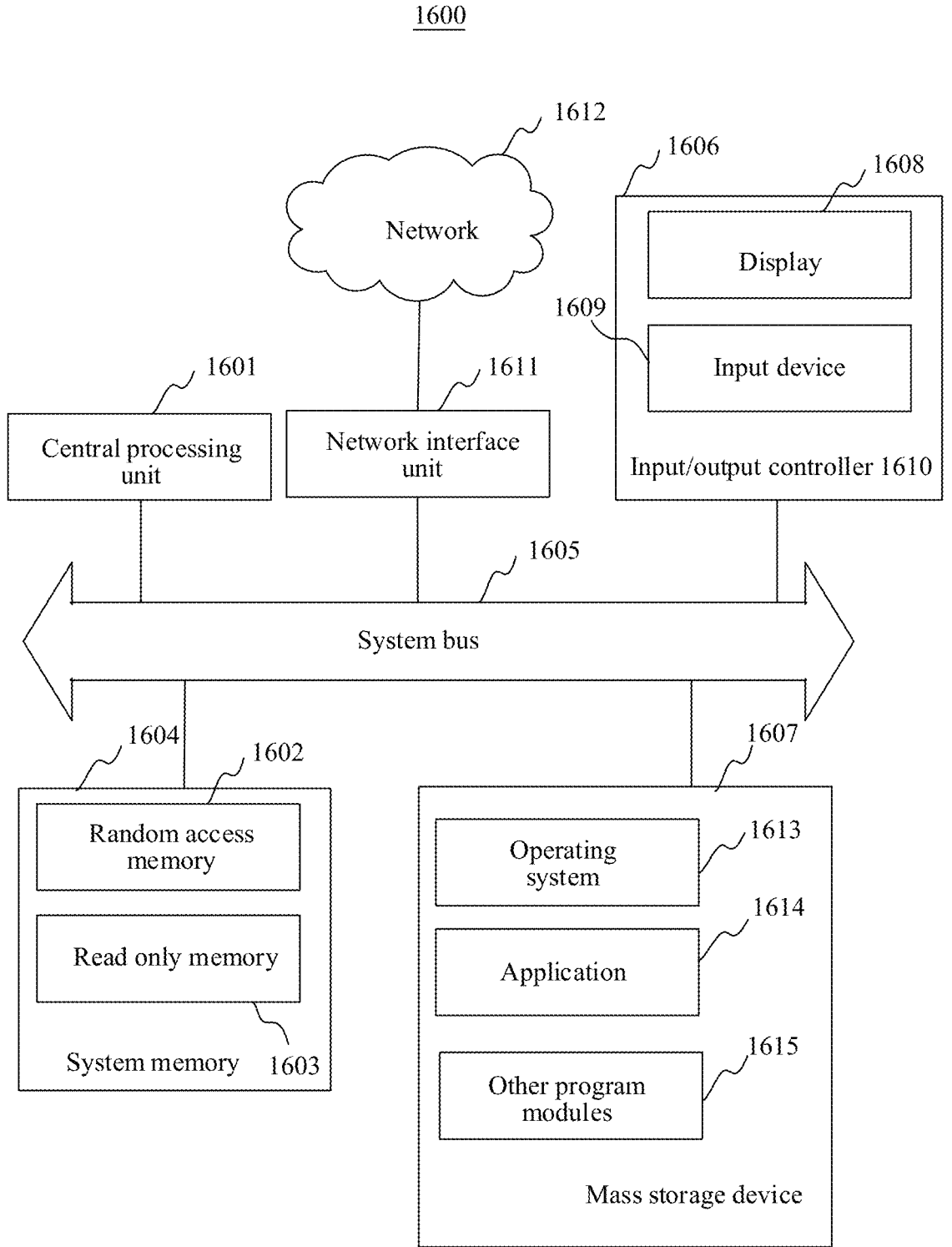
FIG. 16 is a structural block diagram of a computer device provided in one exemplary embodiment of this disclosure.

FIG. 16 is a schematic structural diagram of a computer device provided in an embodiment of this disclosure. Specifically, the computer device 1600 includes a central processing unit (CPU) 1601, a system memory 1604 including a random access memory (RAM) 1602 and a read only memory (ROM) 1603, and a system bus 1605 connected to the system memory 1604 and the central processing unit 1601. The computer device 1600 further includes a basic input/output (I/O) controller 1606 for assisting information transmission between devices in a computer, and a mass storage device 1607 for storing an operating system 1613, an application 1614, and other program modules 1615.

The basic I/O system 1606 includes a display 1608 configured to display information, and an input device 1609 configured to input information by a user, such as a mouse and a keyboard. The display 1608 and the input device 1609 are both connected to the CPU 1601 through an I/O controller 1610 connected to the system bus 1605. The basic I/O system 1606 may further include the I/O controller 1610 to receive and process an input from multiple other devices such as a keyboard, a mouse, or an electronic stylus. Similarly, the I/O controller 1610 further provides an output to a display screen, a printer, or another type of output device.

The mass storage device 1607 is connected to the CPU 1601 through the mass storage controller (not shown) connected to the system bus 1605. The mass storage device 1607 and a computer-readable medium associated with the mass storage device provide non-volatile storage to the computer device 1600. That is, the mass storage device 1607 may include a computer-readable medium (not shown) such as a hard disk or a compact disc read-only memory (CD-ROM) drive.

According to the embodiments of this disclosure, the computer device 1600 may further be connected, through a network such as the Internet, to a remote computer on the network for running. That is, the computer device 1600 may be connected to a network 1612 through a network interface unit 1611 connected onto the system bus 1605, or may be connected to another type of network or a remote computer system (not shown) through a network interface unit 1611.

The memory (non-transitory computer-readable storage medium) further includes at least one program, and the at least one program is stored in the memory and configured to be executed by one or more processors (processing circuitry), to implement the image super-resolution method.

The embodiments of this disclosure further provide a computer-readable storage medium, storing at least one program, the at least one program being loaded and executed by a processor to implement the image super-resolution method according to the above embodiments.

According to one aspect of this disclosure, provided is a computer program product, including computer instructions, the computer instructions being stored in a computer-readable storage medium, a processor of a computer device reading the computer instructions from the computer-readable storage medium, and the processor executing the computer instructions to cause the computer device to execute the image super-resolution methods provided in different implementations according to the above aspects.

A person skilled in the art could be aware that in the above one or more examples, functions described in the embodiments of this disclosure may be implemented by hardware, software, firmware, or any combination thereof. When implemented by using software, the functions can be stored in a computer-readable medium or can be used as one or more instructions or code in a computer-readable medium for transmission. The computer-readable medium includes a computer storage medium and a communications medium, where the communications medium includes any medium that enables a computer program to be transmitted from one place to another. The storage medium may be any available medium accessible to a general-purpose or dedicated computer.

In an embodiment, a non-transitory computer-readable storage medium stores computer-readable instructions which, when executed by a computer device, cause the computer device to perform an image super-resolution method includes performing frequency domain transformation on a first image to obtain a spectral feature of the first image, the spectral feature representing a distribution of a grayscale gradient in the first image. The method further includes performing blur kernel prediction based on the spectral feature to obtain a blur kernel of the first image, the blur kernel being a convolution kernel. The method also includes performing super-resolution processing on the first image based on the blur kernel to generate a super-resolved image, a definition of the super-resolved image being higher than a definition of the first image.

In an embodiment, a non-transitory computer-readable storage medium stores computer-readable instructions which, when executed by a computer device, cause the computer device to perform an image super-resolution method includes performing frequency domain transformation on a first sample image to obtain a sample spectral feature of the first sample image, the sample spectral feature representing a distribution of a grayscale gradient in the first sample image. The method further includes inputting the sample spectral feature into a kernel prediction model to obtain a predicted blur kernel outputted by the kernel prediction model, the predicted blur kernel being a convolution kernel. The method also includes performing iterative training on the kernel prediction model based on the predicted blur kernel and a real blur kernel, the real blur kernel being a blur kernel used in generating the first sample image.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image super-resolution method, comprising:

obtaining one or more second images based on a first image, each of the one or more second images having a first size;

performing frequency domain transformation on the one or more second images to obtain one or more first spectrograms of the one or more second images;

performing down-sampling processing on each of the one or more first spectrograms to obtain one or more second spectrograms of the one or more second images, the one or more second spectrograms corresponding to a spectral feature of the first image, the spectral feature representing a distribution of a grayscale gradient in the first image, and each of the one or more second spectrograms having a second size less than the first size;

obtaining one or more blur kernels of the one or more second images based on application of a kernel prediction model to each of the one or more second spectrograms of the one or more second images, each of the one or more blur kernels being a convolution kernel;

generating one or more sub-super-resolved images based on the one or more second images and the one or more blur kernels; and generating a super-resolved image based on the one or more sub-super-resolved images, a definition of the super-resolved image being higher than a definition of the first image.

2. The method according to claim 1, wherein the obtaining the one or more second images includes:

based on a determination that an image size of the first image is greater than the first size, performing image cropping on the first image based on the first size to obtain at least two second images; and the generating the super-resolved image includes:

performing pixel averaging processing on an intersection area of at least two sub-super-resolved images corresponding to the at least two second images; and fusing the at least two sub-super-resolved images based on the processed intersection area to generate the super-resolved image.

3. The method according to claim 1, wherein the obtaining the one or more second images includes:

based on a determination that an image size of the first image is less than the first size, performing image expansion on the first image based on the first size to obtain a single second image, the image expansion including copying and stitching processing of the first image; and the generating the super-resolved image includes:

performing image cropping on a single sub-super-resolved image corresponding to the single second image to generate the super-resolved image.

4. The method according to claim 1, wherein the performing the frequency domain transformation includes:

performing discrete fast Fourier transform on the one or more second images to obtain the one or more first spectrograms.

5. The method according to claim 1, wherein the kernel prediction model includes at least one convolution layer and at least one transposed convolution layer, a number of the at least one convolution layer being consistent with a number of the at least one transposed convolution layer; and the obtaining the one or more blur kernels includes, for each of the one or more blur kernels based on the respective one of the one or more second spectrograms:

performing convolution processing on the corresponding second spectrogram through the at least one convolution layer in the kernel prediction model to obtain a feature vector of the corresponding second spectrogram; and performing transposed convolution processing on the feature vector through the at least one transposed convolution layer to output the corresponding blur kernel.

6. The method according to claim 1, wherein the one or more sub-super-resolved images are generated based on a non-blind super-resolution model according to a spatial feature transform for multiple degradations (SFTMD) network or a residual channel attention network (RCAN).

7. An image super-resolution method, comprising:

performing frequency domain transformation on an i-th sample image to obtain an i-th sample spectrogram of the i-th sample image, the i-th sample image being obtained based on an i-th real blur kernel, i being a positive integer;

inputting the i-th sample spectrogram into a kernel prediction model to obtain an i-th predicted blur kernel outputted by the kernel prediction model, the i-th predicted blur kernel being a convolution kernel;

obtaining i-th first data based on a combination of the i-th sample spectrogram and the i-th real blur kernel;

obtaining i-th second data based on a combination of the i-th sample spectrogram and the i-th predicted blur kernel; and performing iterative training on the kernel prediction model, the iterative training including an i-th-training of the kernel prediction model based on application of a discriminator to the i-th first data and the i-th second data.

8. The method according to claim 7, wherein the performing the iterative training on the kernel prediction model comprises:

obtaining an i-th discrimination result from the discriminator based on the i-th first data and the i-th second data;

calculating an i-th model loss based on the i-th discrimination result; and updating one or more parameters of the discriminator and one or more parameters of the kernel prediction model based on the i-th model loss.

9. The method according to claim 7, wherein the obtaining the i-th first data is based on stitching of the i-th sample spectrogram and the i-th real blur kernel, and the obtaining the i-th second data is based on stitching of the i-th sample spectrogram and the i-th predicted blur kernel.

10. The method according to claim 8, wherein a loss function of the kernel prediction model and the discriminator is a cross-entropy loss function; and the calculating the i-th model loss includes:

when a model parameter of the kernel prediction model in the cross-entropy loss function is kept constant, calculating an i-th model loss of the discriminator based on the i-th discrimination result of the discriminator, the i-th model loss of the discriminator being greater than an (i−1)-th model loss of the discriminator; and when a model parameter of the discriminator in the cross-entropy loss function is kept constant, calculating an i-th model loss of the kernel prediction model based on the i-th discrimination result of the discriminator, the i-th model loss of the kernel prediction model being less than an (i−1)-th model loss of the kernel prediction model.

11. The method according to claim 7, further comprising:

performing image preprocessing on a first image to obtain the i-th sample image of a first size, wherein the performing the frequency domain transformation includes:

performing discrete fast Fourier transform on the i-th sample image to obtain i-th first sample spectrogram of the i-th sample image; and performing down-sampling processing on the i-th first sample spectrogram to obtain i-th second sample spectrogram of a second size, the second size being less than the first size; and the inputting the i-th sample spectrogram into the kernel prediction model includes:

inputting the i-th second sample spectrogram as the i-th sample spectrogram into the kernel prediction model to obtain the i-th predicted blur kernel outputted by the kernel prediction model.

12. The method according to claim 11, wherein the performing the image preprocessing on the first image comprises:

based on a determination that an image size of the first image is greater than the first size, performing image cropping on the first image based on the first size to obtain the i-th sample image; and based on a determination that the image size of the first image is less than the first size, performing image expansion on the first image based on the first size to obtain the i-th sample image, the image expansion including copying and stitching processing on the first image.

13. The method according to claim 7, wherein the method further comprises:

obtaining a third image, a definition of the third image being higher than a definition of a first image;

performing blur processing on the third image based on the i-th real blur kernel to obtain the first image; and obtaining the i-th sample image based on the first image.

14. An image super-resolution apparatus, comprising:
processing circuitry configured to obtain one or more second images based on a first image, each of the one or more second images having a first size;

perform frequency domain transformation on the one or more second images to obtain one or more first spectrograms of the one or more second images;

perform down-sampling processing on each of the one or more first spectrograms to obtain one or more second spectrograms of the one or more second images, the one or more second spectrograms corresponding to a spectral feature of the first image, the spectral feature representing a distribution of a gray-scale gradient in the first image, and each of the one or more second spectrograms having a second size less than the first size;

obtain one or more blur kernels of the one or more second images based on application of a kernel prediction model to each of the one or more second spectrograms of the one or more second images, each of the one or more blur kernels being a convolution kernel;

generate one or more sub-super-resolved images based on the one or more second images and the one or more blur kernels; and generate a super-resolved image based on the one or more sub-super-resolved images, a definition of the super-resolved image being higher than a definition of the first image.

15. The apparatus according to claim 14, wherein the processing circuitry is configured to:

based on a determination that an image size of the first image is greater than the first size, perform image cropping on the first image based on the first size to obtain at least two second images;

perform pixel averaging processing on an intersection area of at least two sub-super-resolved images corresponding to the at least two second images; and fuse the at least two sub-super-resolved images based on the processed intersection area to generate the super-resolved image.

16. The apparatus according to claim 14, wherein the processing circuitry is configured to:

based on a determination that an image size of the first image is less than the first size, perform image expansion on the first image based on the first size to obtain a single second image, the image expansion including copying and stitching processing of the first image; and perform image cropping on a single sub-super-resolved image corresponding to the single second image to generate the super-resolved image.

17. The apparatus according to claim 14, wherein the processing circuitry is configured to:

perform discrete fast Fourier transform on the one or more second images to obtain the one or more first spectrograms.

18. The apparatus according to claim 14, wherein the kernel prediction model includes at least one convolution layer and at least one transposed convolution layer, a number of the at least one convolution layer being consistent with a number of the at least one transposed convolution layer; and the processing circuitry is configured to:

perform convolution processing on the corresponding second spectrogram through the at least one convolution layer in the kernel prediction model to obtain a feature vector of the corresponding second spectrogram; and perform transposed convolution processing on the feature vector through the at least one transposed convolution layer to output the corresponding blur kernel.

19. The apparatus according to claim 14, wherein the one or more sub-super-resolved images are generated based on a non-blind super-resolution model according to a spatial feature transform for multiple degradations (SFTMD) network or a residual channel attention network (RCAN).

* * * * *